US011711452B2

(12) United States Patent
Akl et al.

(10) Patent No.: US 11,711,452 B2
(45) Date of Patent: Jul. 25, 2023

(54) MULTIPLEXING SIDELINK AND RADIO ACCESS TRAFFIC

(71) Applicant: QUALCOMM Incorporated, San Diego, CA (US)

(72) Inventors: Naeem Akl, Somerville, NJ (US); Karl Georg Hampel, Hoboken, NJ (US); Sony Akkarakaran, Poway, CA (US); Navid Abedini, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/303,564

(22) Filed: Jun. 2, 2021

(65) Prior Publication Data

US 2022/0394113 A1    Dec. 8, 2022

(51) Int. Cl.
*H04L 69/22*    (2022.01)
*H04W 80/02*    (2009.01)
*H04W 72/20*    (2023.01)

(52) U.S. Cl.
CPC ............. *H04L 69/22* (2013.01); *H04W 72/20* (2023.01); *H04W 80/02* (2013.01)

(58) Field of Classification Search
CPC ... H04L 69/22; H04W 72/0406; H04W 76/11; H04W 76/14; H04W 80/02; H04W 88/04; H04W 92/18; H04W 72/20; H04W 72/566

See application file for complete search history.

(56) References Cited

U.S. PATENT DOCUMENTS

| | | | | |
|---|---|---|---|---|
| 2018/0234518 A1* | 8/2018 | Zhu | ..................... | H04W 56/001 |
| 2018/0279322 A1* | 9/2018 | Pang | ..................... | H04W 76/27 |
| 2020/0374953 A1* | 11/2020 | Majmundar | .......... | H04W 92/20 |
| 2021/0037503 A1* | 2/2021 | Nam | ..................... | H04W 72/02 |
| 2021/0306984 A1* | 9/2021 | Lee | ..................... | H04W 72/02 |
| 2022/0070951 A1* | 3/2022 | Novlan | ................... | H04L 45/24 |
| 2022/0159500 A1* | 5/2022 | Ji | .......................... | H04W 24/10 |
| 2022/0312311 A1* | 9/2022 | Vangala | .......... | H04W 36/00835 |

FOREIGN PATENT DOCUMENTS

| | | |
|---|---|---|
| CN | 113973284 A * | 1/2022 |
| WO | WO-2021134723 A1 * | 7/2021 |

OTHER PUBLICATIONS

English translation of PCT/CN2019/130982 (Year: 2019).*
English translation of Application No. 2020107244750 (Year: 2020).*
International Search Report and Written Opinion—PCT/US2022/071856—ISA/EPO—dated Jul. 28, 2022.

(Continued)

*Primary Examiner* — Kan Yuen
(74) *Attorney, Agent, or Firm* — Harrity & Harrity, LLP

(57) ABSTRACT

Various aspects of the present disclosure generally relate to wireless communication. In some aspects, a first wireless node may receive a packet from a second wireless node, wherein the packet is associated with an indication of whether the packet is associated with a radio access link or a sidelink of the first wireless node. The first wireless node may transmit the packet on the radio access link or the sidelink in accordance with the indication. Numerous other aspects are described.

30 Claims, 16 Drawing Sheets

(56) References Cited

OTHER PUBLICATIONS

Qualcomm Incorporated (Mediator): "Rel-17 IAB Email Discussion—Report", 3GPP TSG RAN meeting #86, RP-193094, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 8, 2019 (Dec. 8, 2019), 39 Pages, XP051838727, Retrieved from the Internet: URL: https://ftp.3gpp.org/tsg_ran/TSG_RAN/TSGR_86/Docs/RP-193094.zip, RP-193094 Rel-17 IAB email discussion—Phase 1 and 2 summary-v2 trch.doc [retrieved on Dec. 8, 2019] p. 13-p. 14.
ZTE: "Discussions on General Aspects of D2D UE-to-Network Relay", 3GPP TSG-RAN WG1 Meeting #81, 3GPP Draft, R1-152965, D2D Network-To-UE Relay, 3rd Generation Partnership Project (3GPP), Mobile Competence Centre, 650, Route Des Lucioles, F-06921 Sophia-Antipolis Cedex, France, vol. RAN WG1, No. Fukuoka, Japan, May 25, 2015-May 29, 2015, May 16, 2015 (May 16, 2015), 4 Pages, XP050971278, Retrieved from the Internet: URL: http://www.3gpp.org/ftp/tsg_ran/WG1_RL1/TSGR1_81/Docs/, [retrieved on May 16, 2015], p. 1, figure 1.

\* cited by examiner

MULTIPLEXING SIDELINK AND RADIO ACCESS TRAFFIC

FIELD OF THE DISCLOSURE

Aspects of the present disclosure generally relate to wireless communication and to techniques and apparatuses for multiplexing sidelink and radio access traffic.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first wireless node includes receiving a packet from a second wireless node, wherein the packet is associated with an indication of whether the packet is associated with a radio access link or a sidelink of the first wireless node; and transmitting the packet on the radio access link or the sidelink in accordance with the indication.

In some aspects, a method of wireless communication performed by a first wireless node includes receiving a packet associated with an indication of whether the packet is associated with a radio access link or a sidelink of a second wireless node; and transmitting the packet to the second wireless node.

In some aspects, an apparatus for wireless communication at a first wireless node includes a memory, and one or more processors, coupled to the memory, configured to: receive a packet from a second wireless node, wherein the packet is associated with an indication of whether the packet is associated with a radio access link or a sidelink of the first wireless node; and transmit the packet on the radio access link or the sidelink in accordance with the indication.

In some aspects, an apparatus for wireless communication at a first wireless node includes a memory, and one or more processors, coupled to the memory, configured to: receive a packet associated with an indication of whether the packet is associated with a radio access link or a sidelink of a second wireless node; and transmit the packet to the second wireless node.

In some aspects, a non-transitory computer-readable medium storing a set of instructions for wireless communication includes one or more instructions that, when executed by one or more processors of a first wireless node, cause the first wireless node to: receive a packet from a second wireless node, wherein the packet is associated with an indication of whether the packet is associated with a radio access link or a sidelink of the first wireless node; and transmit the packet on the radio access link or the sidelink in accordance with the indication.

In some aspects, a non-transitory computer-readable medium storing a set of instructions for wireless communication includes one or more instructions that, when executed by one or more processors of a first wireless node, cause the first wireless node to: receive a packet associated with an indication of whether the packet is associated with a radio access link or a sidelink of a second wireless node; and transmit the packet to the second wireless node.

In some aspects, an apparatus for wireless communication includes means for receiving a packet from a wireless node, wherein the packet is associated with an indication of whether the packet is associated with a radio access link or a sidelink of the first wireless node; and means for transmitting the packet on the radio access link or the sidelink in accordance with the indication.

In some aspects, an apparatus for wireless communication includes means for receiving a packet associated with an indication of whether the packet is associated with a radio access link or a sidelink of a wireless node; and means for transmitting the packet to the second wireless node.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
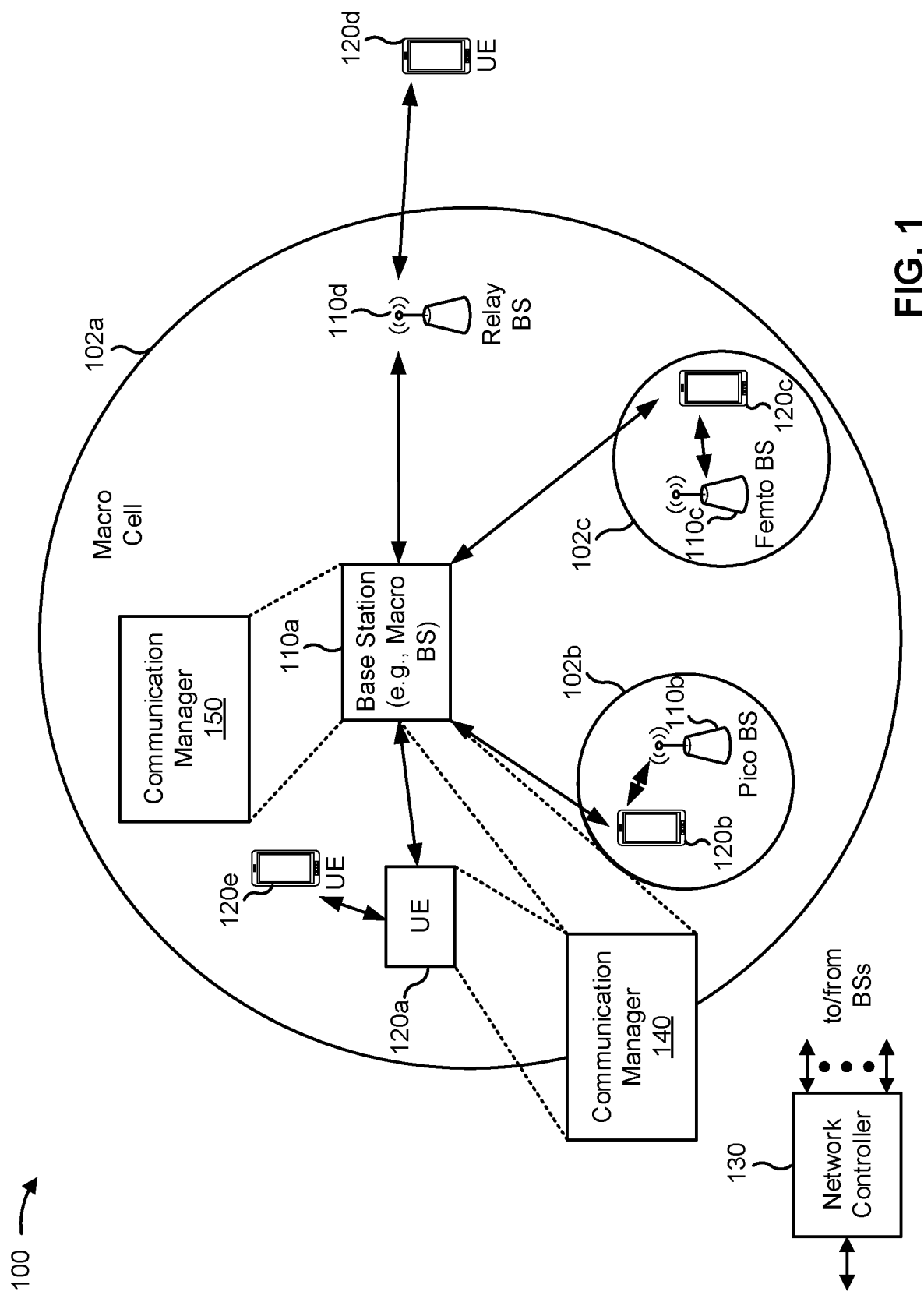
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the first wireless node may include a communication manager 140. As described in more detail elsewhere herein, the communication manager 140 may receive a packet from a second wireless node, wherein the packet is associated with an indication of whether the packet is associated with a radio access link or a sidelink of the first wireless node; and transmit the packet on the radio access link or the sidelink in accordance with the indication. Additionally, or alternatively, the communication manager 140 may perform one or more other operations described herein.

In some aspects, the first wireless node may include a communication manager 150. As described in more detail elsewhere herein, the communication manager 150 may receive a packet associated with an indication of whether the packet is associated with a radio access link or a sidelink of a second wireless node; and transmit the packet to the second wireless node. Additionally, or alternatively, the communication manager 150 may perform one or more other operations described herein.

As indicated above, FIG. 1 is provided as an example. Other examples may differ from what is described with regard to FIG. 1.

Figure 2:
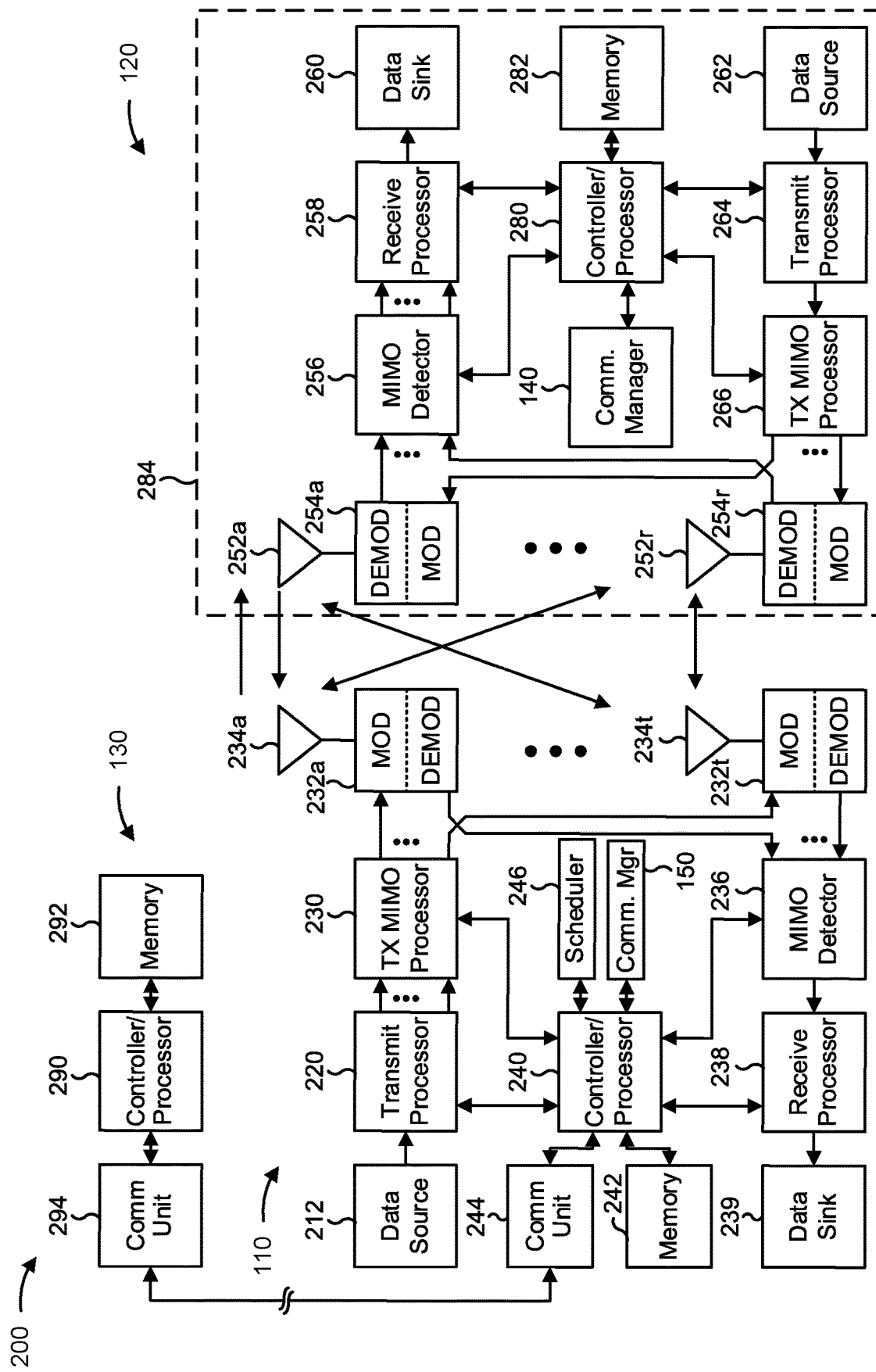
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indications (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indication (RSSI) parameter, a reference signal received quality (RSRQ) parameter, and/or a channel quality indication (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-12).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-12).

Controller/processor 240 of base station 110, controller/processor 280 of UE 120, and/or any other component(s) of FIG. 2 may perform one or more techniques associated with multiplexing sidelink and radio access traffic, as described in more detail elsewhere herein. For example, controller/processor 240 of base station 110, controller/processor 280 of UE 120, and/or any other component(s) of FIG. 2 may perform or direct operations of, for example, process 1300 of FIG. 13, process 1400 of FIG. 14, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1300 of FIG. 13, process 1400 of FIG. 14, and/or other processes as described herein. In some aspects, executing instructions may include running the instructions, converting the instructions, compiling the instructions, and/or interpreting the instructions, among other examples.

In some aspects, a wireless node includes means for receiving a packet from a second wireless node, wherein the packet is associated with an indication of whether the packet is associated with a radio access link or a sidelink of the wireless node; and/or means for transmitting the packet on the radio access link or the sidelink in accordance with the indication. In some aspects, the means for the first wireless node to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a wireless node includes means for receiving a packet associated with an indication of whether the packet is associated with a radio access link or a sidelink of another wireless node; and/or means for transmitting the packet to the other wireless node. In some aspects, the means for the wireless node to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
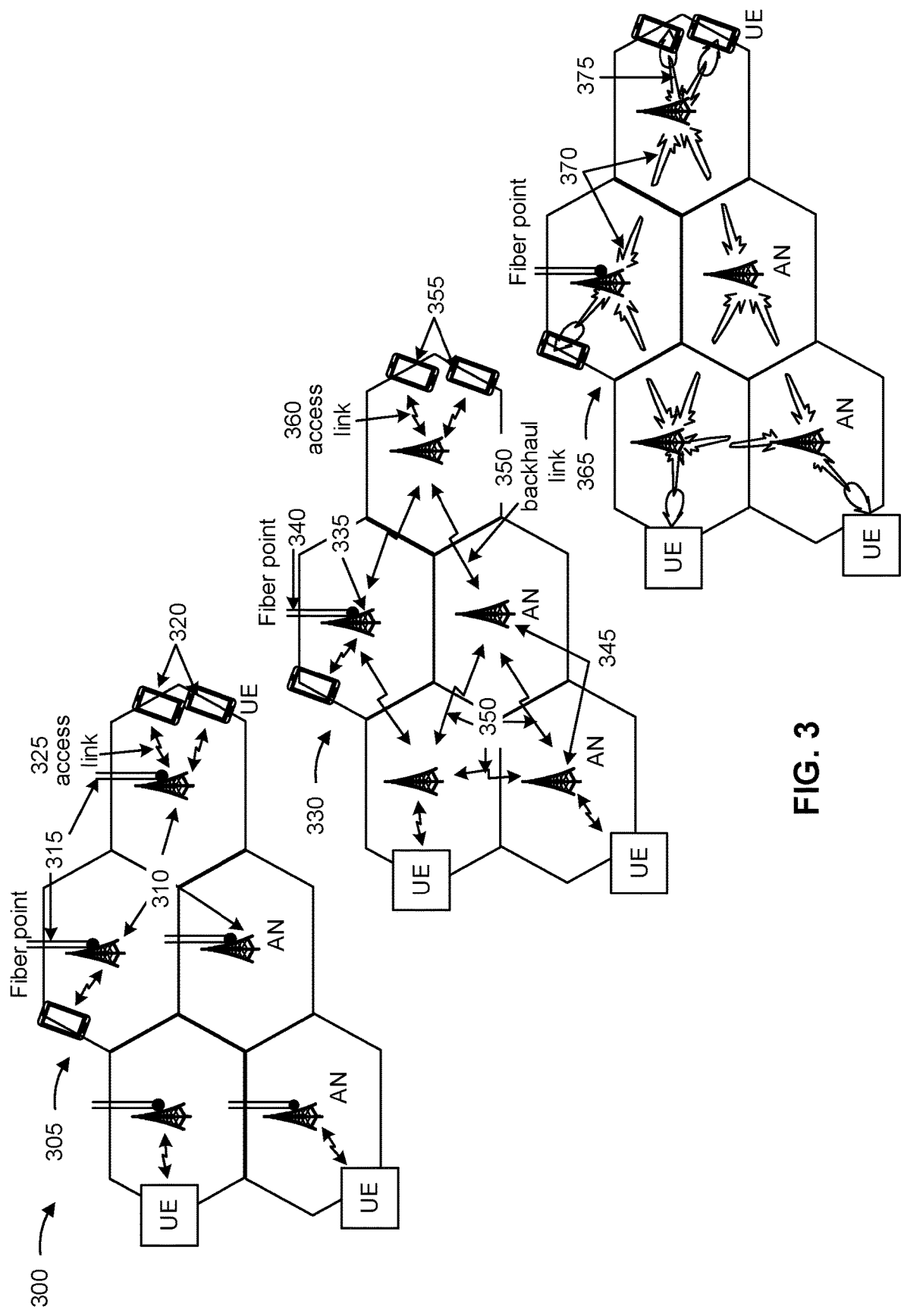
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, "anchor node" may refer to a UE that is directly in communication with a base station (e.g., an anchor base station or a non-anchor base station).

Some techniques and apparatuses described herein provide multiplexing and demultiplexing of traffic via backhaul links such as those illustrated in FIG. 3. In particular, some techniques and apparatuses described herein may support multiplexing and demultiplexing of radio access traffic (such as associated with a Uu interface) and sidelink traffic (such as associated with a ProSe Sidelink (PC5) interface), as described in more detail below.

As indicated above, FIG. 3 is provided as an example. Other examples may differ from what is described with regard to FIG. 3.

Figure 4:
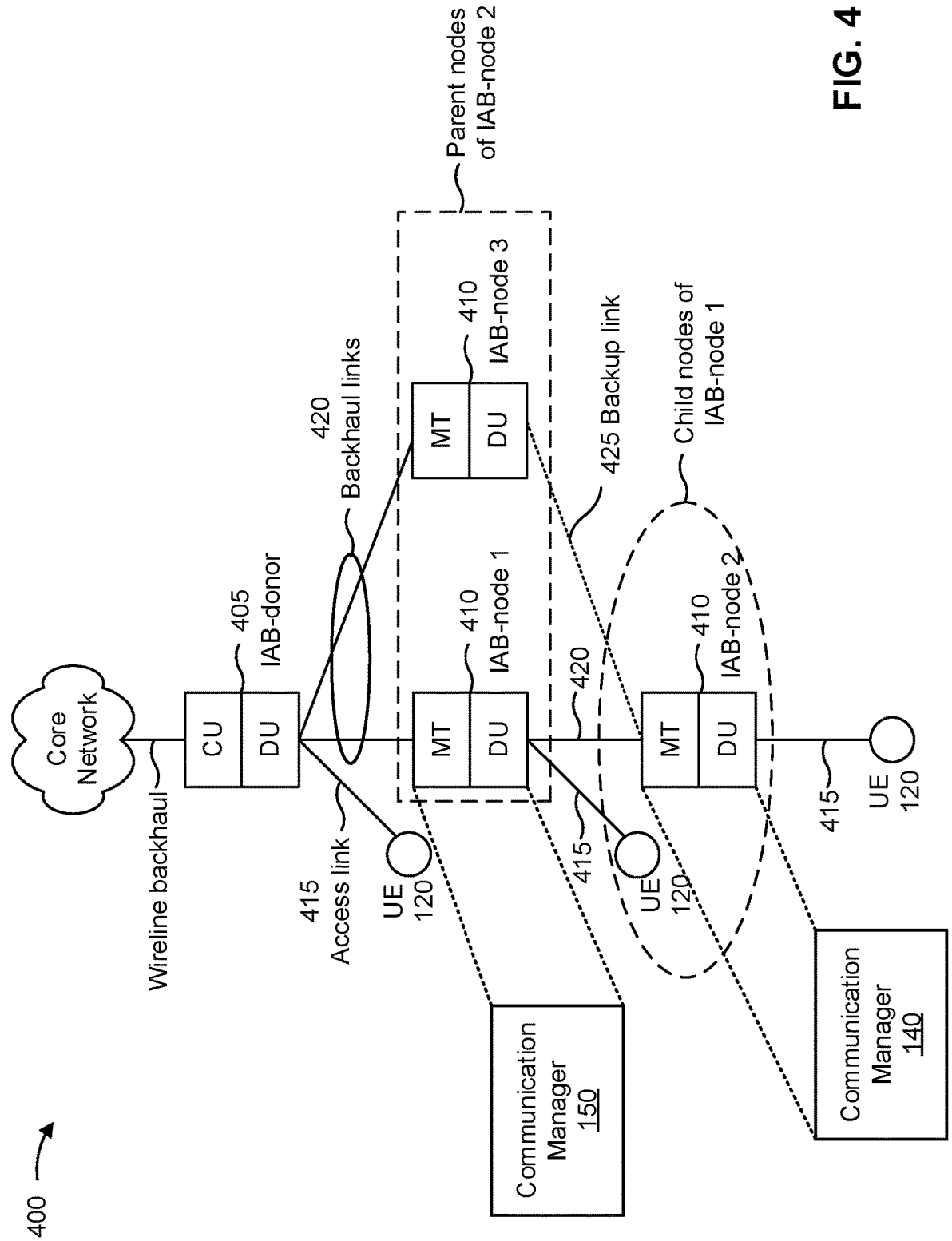
FIG. 4 is a diagram illustrating an example of an integrated access and backhaul network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with 3. As shown, an IAB donor 405 may include a central unit (CU), which may perform access node controller (ANC) functions and/or AMF functions. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

Some techniques and apparatuses described herein provide multiplexing and demultiplexing, on a backhaul link 420, of traffic associated with an access link 415 and traffic associated with a sidelink (not shown in FIG. 4).

As indicated above, FIG. 4 is provided as an example. Other examples may differ from what is described with regard to FIG. 4.

Figure 5:
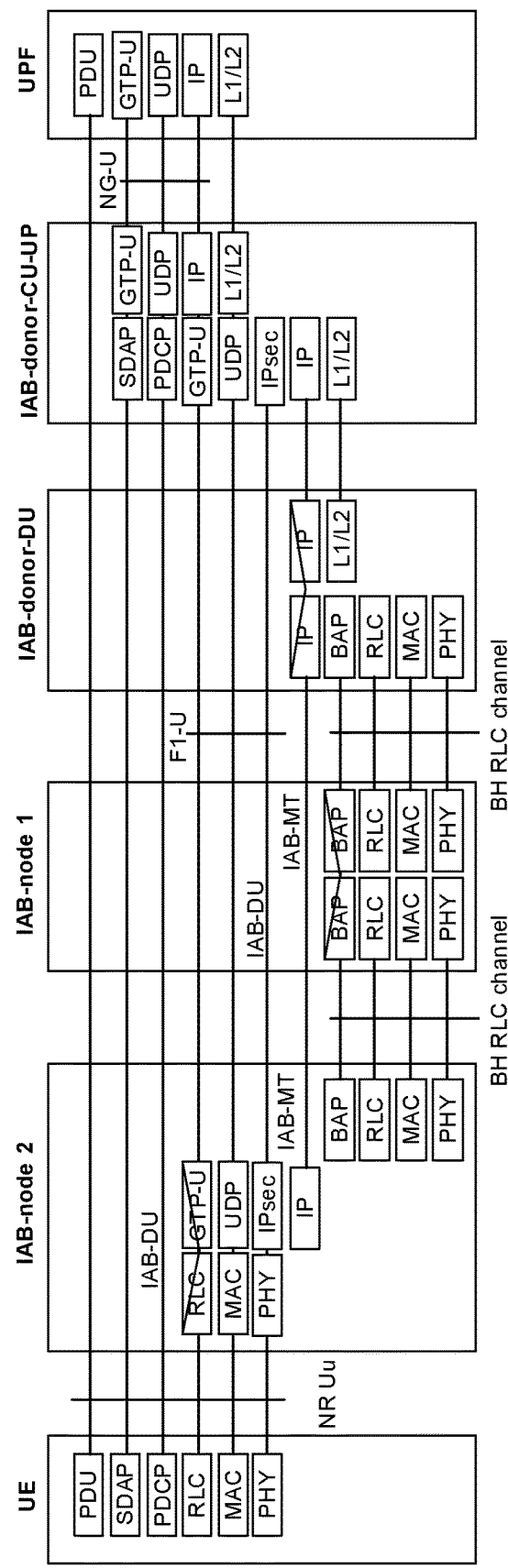
FIG. 5 is a diagram illustrating an example of a user plane (UP) protocol configuration for an integrated access and backhaul network, in accordance with the present disclosure.

FIG. 5 is a diagram illustrating an example 500 of a user plane (UP) protocol configuration for an IAB network, in accordance with the present disclosure. As shown, example 500 includes a UE (e.g., UE 120), an IAB-node 1 (e.g., IAB node 410, non-anchor base station 345), an IAB-node 2 (e.g., IAB node 410, non-anchor base station 345), an IAB-donor-DU (e.g., anchor base station 335, a DU of IAB donor 405), an IAB-donor-CU-UP (e.g., anchor base station 335, a CU of IAB donor 405), and a user plane function (UPF). The UPF is a component of the 5G core infrastructure system architecture. The UPF may provide interconnection between mobile infrastructure (that is, the radio access network) and the data network, a protocol data unit (PDU) session anchor point, packet routing and forwarding, application detection, per-flow quality of service (QoS) handling, and traffic usage reporting. As described above, the IAB-node 1 and the IAB-node 2 each include an IAB-DU and an IAB-MT. The IAB-node 2 may function as a relay node for the IAB-node 1. The IAB-donor, the IAB-node 1, and the IAB-node 2 may be referred to herein as wireless nodes. The IAB-node 2 may be an access node for the UE, meaning that the IAB-node 2 provides access to the wireless network for the UE.

The UE may have a PDU session, a service data adaptation protocol (SDAP) layer, and a packet data convergence protocol (PDCP) layer for communication with the UPF and/or the IAB-donor-CU-UP. The UE may also include a radio link control (RLC) layer, a medium access control (MAC) layer, and a physical (PHY) layer for communication with the IAB-node 2. As shown, the UE may communicate with the UPF and the IAB-node 2 via an NR Uu interface. More generally, the UE may communicate with the UPF and the IAB-node 2 via a radio access interface. For example, higher-layer communications originating from the PDU session, the SDAP layer, or the PDCP layer may be communicated to the IAB-node 2 via the RLC, MAC, and PHY layers, and may be relayed to the UPF or the IAB-donor CU-UP via the IAB-node 2 and the IAB-node 1.

The IAB-DU of the IAB-node 2 may include an RLC layer, a MAC layer, and a PHY layer for communication with the UE. Furthermore, the IAB-DU of the IAB-node 2 may include a general packet radio service (GPRS) tunneling protocol (GTP) user (GTP-U) layer, a user datagram protocol (UDP) layer, and an Internet Protocol security (IPSec) layer which is used for configuration and communication with the IAB-donor-CU-UP. The IAB-DU of the IAB-node 2 may communicate with the IAB-donor-CU-UP via an F1 user plane (F1-U) interface. The F1-U interface may use the same stack as for wireline deployment. The F1-U may be security protected via IPsec (such as by the IPsec layer) using a 3GPP network domain security framework (e.g., SA3). The F1-U tunnel may transport traffic of a UE data radio bearer (DRB). The IAB-DU of the IAB-node 2 may also include an IP layer for communication with the IAB-donor-DU.

The IAB-MTs of the IAB-node 1 and the IAB-node 2 may include a backhaul adaptation protocol (BAP) layer, an RLC layer, a MAC layer, and a PHY layer. The BAP layer may be used for routing of communications (such as between the UE and the UPF or the IAB-donor-CU-UP) across the IAB topology. The RLC layer may support acknowledged mode (AM) and unacknowledged mode (UM). The BAP layer may carry an IP layer. For example, the IAB-DU may hold an IP address which is routable from the IP layer on the wireless fronthaul. The IAB-donor-DU may implement an IP routing function, such as via the IAB-donor-DU's IP layer. IP address management for the BAP layer's IP layer is performed within the RAN. As shown, the IAB-node MTs may communicate with their respective parent IAB-DUs or donor-DUs via backhaul (BH) RLC channels, as described in more detail elsewhere herein.

The IAB-donor-DU may include an IP layer, a BAP layer, an RLC layer, a MAC layer, and a PHY layer for communication with the IAB-node 1 and/or the IAB-node 2. Communication between the IAB-donor-DU and the IAB-node 1 may occur via a set of BH RLC channels, as described elsewhere herein. As mentioned above, the IP layer may implement an IP routing function, and the BAP layer may be used for routing across the IAB topology. Furthermore, the IAB-donor-DU may include an IP layer and one or more Layer 1/Layer 2 (L1/L2) entities for communication with the IAB-donor-CU-UP.

The IAB-donor-CU-UP includes an SDAP layer, a PDCP layer, a GTP—U layer, a UDP layer, an IPSec layer, an IP layer, and one or more L1/L2 entities for radio access communication, such as with the UE and the IAB-nodes 1 and 2. Furthermore, the IAB-donor-CU-UP includes a GTP—U layer, a UDP layer, an IP layer, and an L1/L2 entity for communication with the UPF. Communication between the IAB-donor-CU-UP and the UPF may occur via a next generation user plane (NG-U) interface (via packets encapsulated by the one or more L1/L2 entities).

As indicated above, FIG. 5 is provided as an example. Other examples may differ from what is described with regard to FIG. 5.

Figure 6:
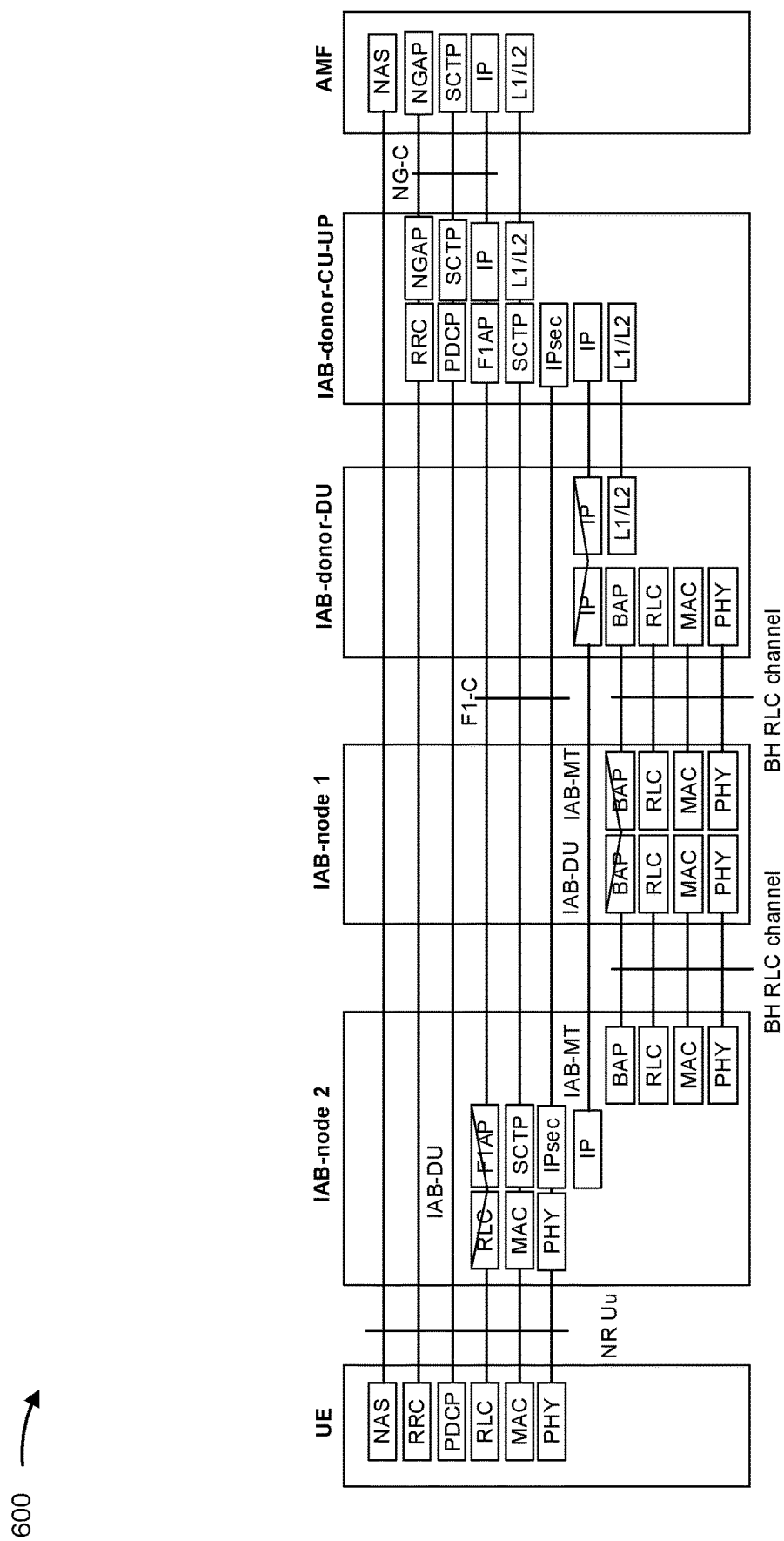
FIG. 6 is a diagram illustrating an example of a control plane (CP) protocol configuration for an IAB network, in accordance with the present disclosure.

FIG. 6 is a diagram illustrating an example 600 of a control plane (CP) protocol configuration for an IAB network, in accordance with the present disclosure. As shown, example 600 includes a UE (e.g., UE 120), an IAB-node 1 (e.g., IAB node 410, non-anchor base station 345), an IAB-node 2 (e.g., IAB node 410, non-anchor base station 345), an IAB-donor-DU (e.g., anchor base station 335, a DU of IAB donor 405), an IAB-donor-CU-CP (e.g., anchor base station 335, a CU of IAB donor 405), and an access and mobility management function (AMF). The AMF may handle connection and mobility management tasks for the UE. As in example 500, the IAB-node 2 may function as a relay node for the IAB-node 1. The IAB-node 2 may be an access node for the UE, meaning that the IAB-node 2 provides access to the wireless network for the UE. The BH RLC channels, BAP layers, and IP layers may generally function as described in connection with FIG. 5.

As shown, the UE may include a non-access stratum (NAS) layer, which may communicate with an NAS layer of the AMF via a radio access interface such as an NR Uu interface. Furthermore, the UE may include a radio resource control (RRC) layer and a PDCP layer, which may communicate with the IAB-donor-CU-CP via the radio access interface. The UE may also include an RLC layer, a MAC layer, and a PHY layer, which may communicate with the IAB-DU of the IAB-node 2 via the radio access interface.

As shown, the IAB-DU of the IAB-node 2 may include an RLC layer, a MAC layer, and a PHY layer for communication with the UE. Furthermore, the IAB-DU of the IAB-node 2 may include an F1 application protocol (F1AP) layer, a stream control transmission protocol (SCTP) layer, and an IPSec layer for communication with the IAB-donor-CU-CP via an F1 control plane (F1-C) interface. The F1-C interface may use the same stack as for a wireline deployment. The F1-C interface may be security protected via IPsec or datagram transport layer security (DTLS) using a 3GPP network domain security framework (e.g., SA3). The IAB-DU may also include an IP layer for communicating the UE's control traffic with the IAB-donor-DU (and/or the IAB-donor-CU-CP).

As shown, the IAB-node 1 and the IAB-node 2 may each include a BAP layer, an RLC layer, a MAC layer, and a PHY layer. The IAB-node 1 may use the BAP, RLC, MAC, and PHY layers for communication with the IAB-node 2 and with the IAB-donor-DU. For example, communication between the IAB-node 2, the IAB-node 1, and the IAB-donor DU may occur via BH RLC channels, described elsewhere herein.

As shown, the IAB-donor-DU may include an IP Layer for communication with the IAB-node 2 (e.g., via the IAB-node 1) and the IAB-donor-CU-CP. Furthermore, the IAB-donor-DU may include one or more L1/L2 entities for communication with the IAB-donor-CU-CP.

As shown, the IAB-donor-CU-CP may include an RRC layer and a PDCP layer for communication with the UE. Furthermore, the IAB-donor-CU-CP may include an F1AP layer, an SCTP layer, and an IPSec layer for communication with the IAB-node 2, such as via the IAB-node 1. As shown, the IAB-donor-CU-CP may include an IP layer and one or more L1/L2 entities for communication with the IAB-donor-DU. As further shown, the IAB-donor-CU-CP may include a next generation application protocol (NGAP) layer, an SCTP layer, an IP layer, and an L1/L2 entity for communication with the AMF, such as via a next generation control plane (NG-C) interface.

As indicated above, FIG. 6 is provided as an example. Other examples may differ from what is described with regard to FIG. 6.

Figure 7:
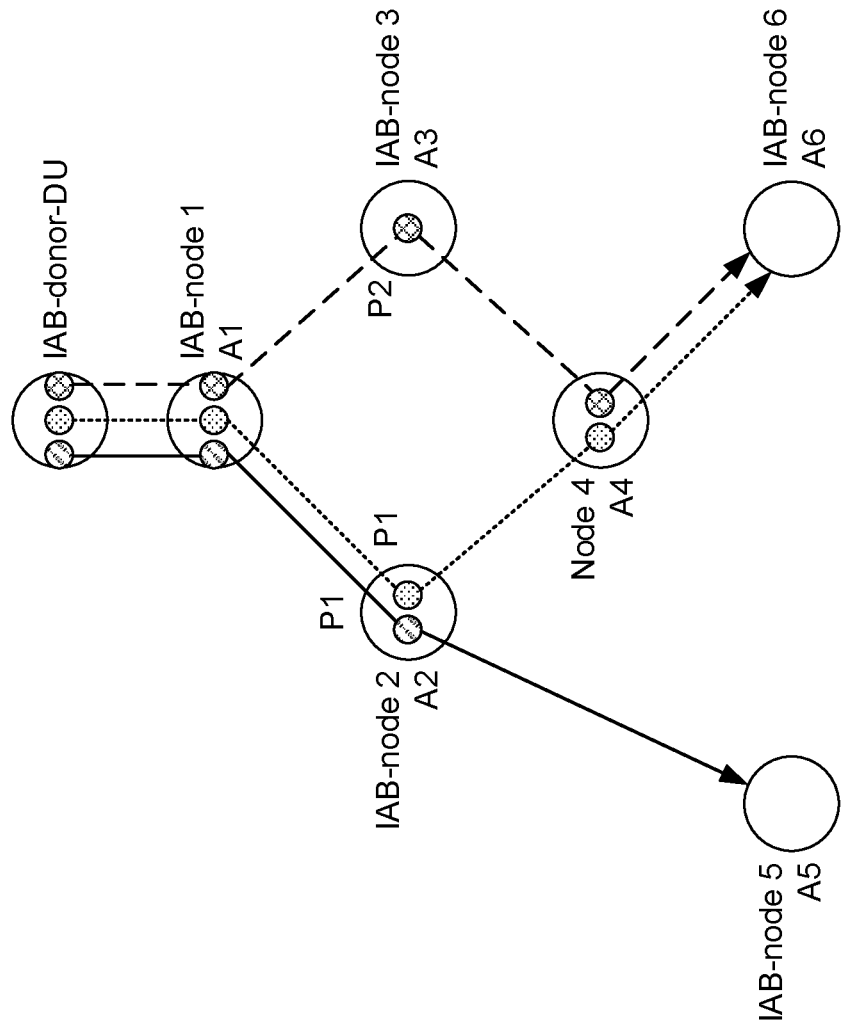
FIG. 7 is a diagram illustrating an example of routing across a wireless backhaul such as an IAB network, in accordance with the present disclosure.

FIG. 7 is a diagram illustrating an example 700 of routing across a wireless backhaul such as an IAB network, in accordance with the present disclosure. Example 700 includes an IAB-donor-DU (e.g., BS 110, anchor base station 335, the DU of IAB-donor 405, the IAB-donor-DU of FIGS. 5 and 6), and a set of IAB-nodes 1 through 6 (e.g., BS 110, UE 120, anchor base station 335, non-anchor base station 345, IAB-node 410, IAB-node 1 or IAB-node 2 of FIGS. 5 and 6). Communications may be routed from the IAB-donor-DU to an endpoint via one or more of the IAB-nodes. BAP layers of the IAB-nodes and the IAB-donor-DU may facilitate the routing of such communications, as described below. Each IAB-node may be associated with an identifier, referred to herein as a BAP address. For example, IAB-node 1 is associated with a BAP address of "A1," IAB-node 2 is associated with a BAP address of "A2," and so on. A BAP address may indicate a destination node for a packet. For example, the destination node may be a UE's access IAB-node in the downstream direction (that is, from the IAB-donor-DU to the UE), or may be an IAB-donor-DU in the upstream direction (that is, from the UE or an IAB-node to the IAB-donor-DU).

A packet may be routed via a path. Three paths are shown in example 700. The three paths are differentiated from each other by different line patterns. Each path is associated with a path identifier, which may be referred to herein as a BAP path identifier. An IAB-node may be configured with information (referred to herein as a routing configuration) indicating a next hop corresponding to a combination of a given path identifier and a given BAP address. The path identifier can differentiate multiple routes to the same destination node. For example, a first path, shown by a dotted arrow, is associated with a path identifier of P1 and a second path, shown by a dashed arrow, is associated with a path identifier of P2. In this case, the first path and the second path both lead to IAB-node 6. By configuring different paths between the same source and destination nodes using different path identifiers, the IAB-donor provides resilience and multiple options for routing to a given destination node (e.g., if a node on the first path fails, the packet can instead be routed via the second path), as well as enabling load balancing across the topology.

A transmitting device (such as the IAB-donor-DU or an IAB-node) may generate a packet. The packet may include a BAP header. For example, the BAP layer of the transmitting node may add the BAP header when the packet enters the BAP layer of the transmitting node from an upper layer. The BAP header may identify a BAP routing identifier. A BAP routing identifier may include a BAP address of a destination node of the packet, as well as a path identifier for a path to the destination node.

On intermediate hops, the packet is routed to a next hop based at least in part on the BAP routing identifier and based at least in part on the routing configuration described above. Once the destination node receives the packet, the destination node may identify the packet as destined to the destination node based at least in part on the BAP address identified by the BAP routing identifier.

For example, referring to example 700, a packet generated by the IAB-donor-DU may be destined to IAB-node 6. The packet may include a BAP header. The BAP header may identify a BAP routing identifier, which may indicate a BAP address of A6 and a route identifier of P1. The IAB-donor-DU may transmit the packet to IAB-node 1. IAB-node 1 may determine that the packet is not destined to IAB-node 1 (since the BAP address of A6 does not match IAB-node 1's BAP address of A1). Furthermore, IAB-node 1 may be configured with routing information indicating that a next hop associated with the BAP routing identifier is to IAB-node 2. IAB-node 2 may perform similar operations as IAB-node 1, and may determine, based at least in part on routing information, that the next hop associated with the BAP routing identifier is to IAB-node 4. IAB-node 4 may perform similar operations as IAB-nodes 1 and 2, and may determine, based at least in part on routing information, that the next hop associated with the BAP routing identifier is to IAB-node 6. IAB-node 6 may determine that the packet is destined to IAB-node 6. IAB-node 6 may provide a payload of the packet to a UE associated with IAB-node 6 (such as a UE to which the packet is destined as identified by the packet).

As indicated above, FIG. 7 is provided as an example. Other examples may differ from what is described with regard to FIG. 7.

Figure 8:
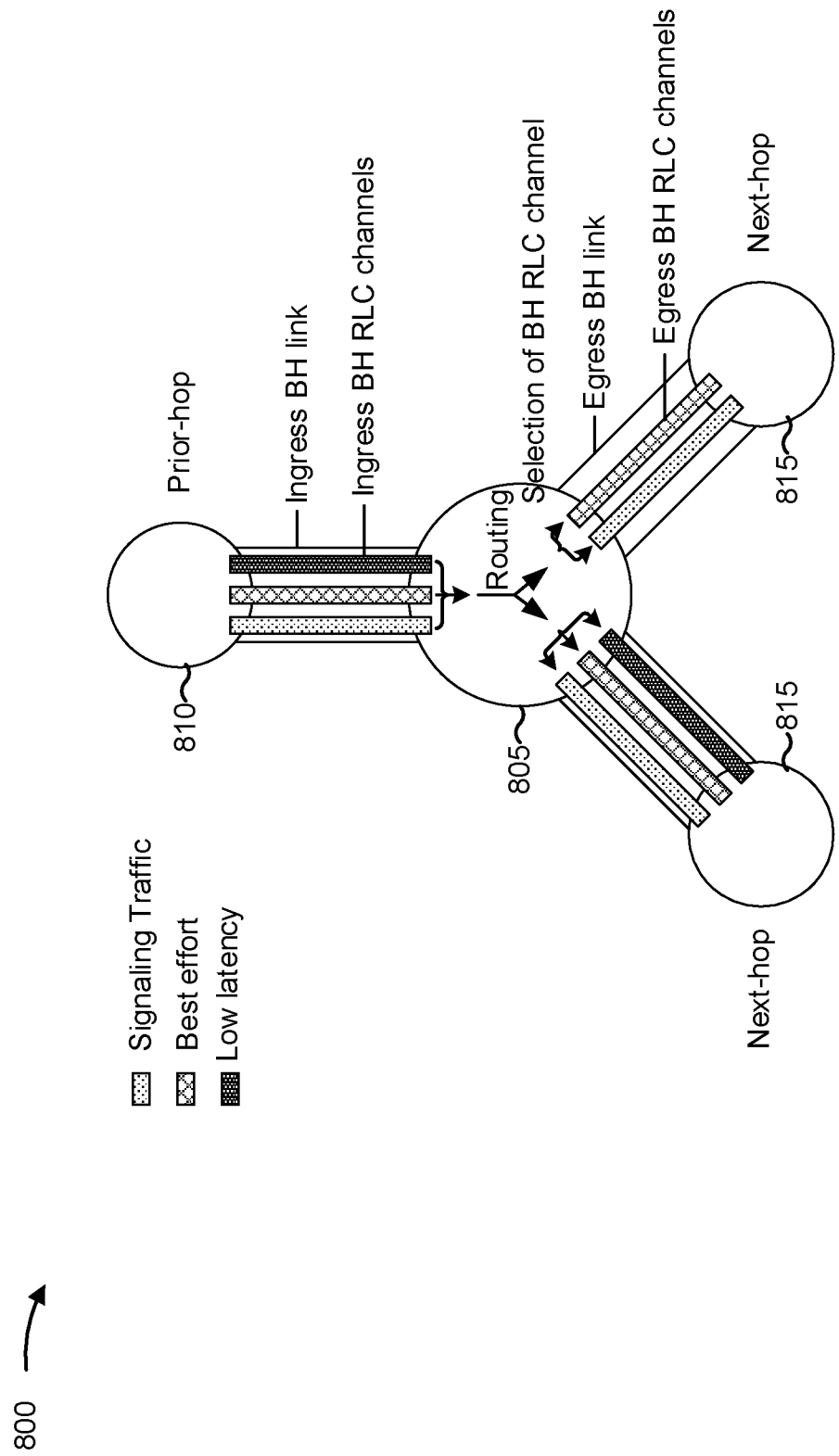
FIG. 8 is a diagram illustrating an example of a radio link control channel configuration for backhaul adaptation protocol packet routing, in accordance with the present disclosure.

FIG. 8 is a diagram illustrating an example 800 of a RLC channel configuration for BAP packet routing, in accordance with the present disclosure. Example 800 illustrates ingress and egress links for a wireless node 805. The wireless node 805 may be on a route associated with BAP routing of packets via a wireless backhaul such as an IAB network. Example 800 also illustrates a wireless node 810 associated with a prior hop and wireless nodes 815 associated with a next hop on the route (e.g., the wireless nodes 815 may be associated with two different routes). The wireless nodes 805, 810, and 815 may include, for example, UE 120, BS 110, anchor base station 335, non-anchor base station 345, IAB-donor 405, IAB-node 410, IAB-node 1 of FIGS. 5 and 6, the IAB-donor or one or more of the IAB-nodes of FIG. 7, the NG-RAN or relay UE 910 of FIG. 9, the NG-RAN or relay UE 1010 of FIG. 10, IAB-node 2/IAB-donor of FIG. 11, or the like. The wireless nodes 805, 810, and 815 are lined by BH links. For example, a BH link between the wireless node 805 and the wireless node 810 is shown as an ingress BH link (since traffic on the ingress BH link is inbound to the wireless node 805), and BH links between the wireless node 805 and the wireless nodes 815 are shown as egress BH links (since traffic on the egress BH links is outbound from the wireless node 805).

The wireless nodes 805, 810, and 815 may communicate via RLC channels. Traffic on the ingress link and/or the egress link(s) may be associated with an RLC channel, such as a BH RLC channel. A BH RLC channel is used for transporting (e.g., backhauling) access traffic between IAB nodes, or between an IAB-donor-DU and an IAB node (such as between an MT and a DU). A BH RLC channel may be mapped to one or more UE radio bearers. For example, several UE radio bearers may be multiplexed onto a single BH RLC channel, such as based at least in part on a quality of service (QoS) profile of the UE radio bearers. As another example, a single UE radio bearer may be mapped to a single BH RLC channel, which enables more granular control of QoS profiles and other parameters. Thus, BH RLC channels support backhauling of UE traffic based at least in part on parameters associated with the UE traffic.

In some aspects, an RLC channel is associated with signaling traffic. In some other aspects, an RLC channel is associated with best effort traffic. In some other aspects, an RLC channel is associated with low latency channels. QoS and traffic prioritization on the backhaul may be enforced through a number of BH RLC channels per backhaul link. Upper layer traffic (such as traffic originating from above the RLC layer) may be mapped to backhaul RLC channels. For example, upper layer traffic associated with an F1-U interface or an X2-U interface may be mapped at the GTP-U tunnel granularity, upper layer traffic associated with an F1-C interface may be mapped at the granularity of non-UE-associated F1AP versus UE-associated F1AP, and non-F1 interface traffic may be mapped at the granularity of a type (for example, different classes of operations, administration, and management (OAM) traffic). Mapping may occur at the traffic's entry point to the BAP layer, such as at an access IAB-node for uplink traffic or at an IAB-donor DU for downlink traffic. At intermediate hops, egress RLC channels may be mapped from ingress RLC channels.

Some RLC channels may be access RLC channels. An access RLC channel is an RLC channel used to carry PDCP traffic for RRC or a data radio bearer (DRB). For example, a UE-to-DU access RLC channel may carry PDCP for RRC or DRB, and an MT-to-DU access RLC channel may carry PDCP for RRC (or DRB). An access RLC channel is used to carry traffic between a gNB a UE endpoint (such as a UE bearer). A BH RLC channel, as described above, may be between an IAB-DU (or an IAB-donor-DU) and a child IAB-MT. The traffic carried by a BH RLC channel is not destined for the child IAB-MT, but for some other child or descendant IAB-MT or UE. BH RLC channels are utilized in IAB because of the multi-hop architecture of IAB. A BH RLC channel is identified with a BH RLC CH identifier (ID) which has 1-to-1 mapping with the logical channel ID of the associated logical channel.

As indicated above, FIG. 8 is provided as an example. Other examples may differ from what is described with regard to FIG. 8.

Figure 9:
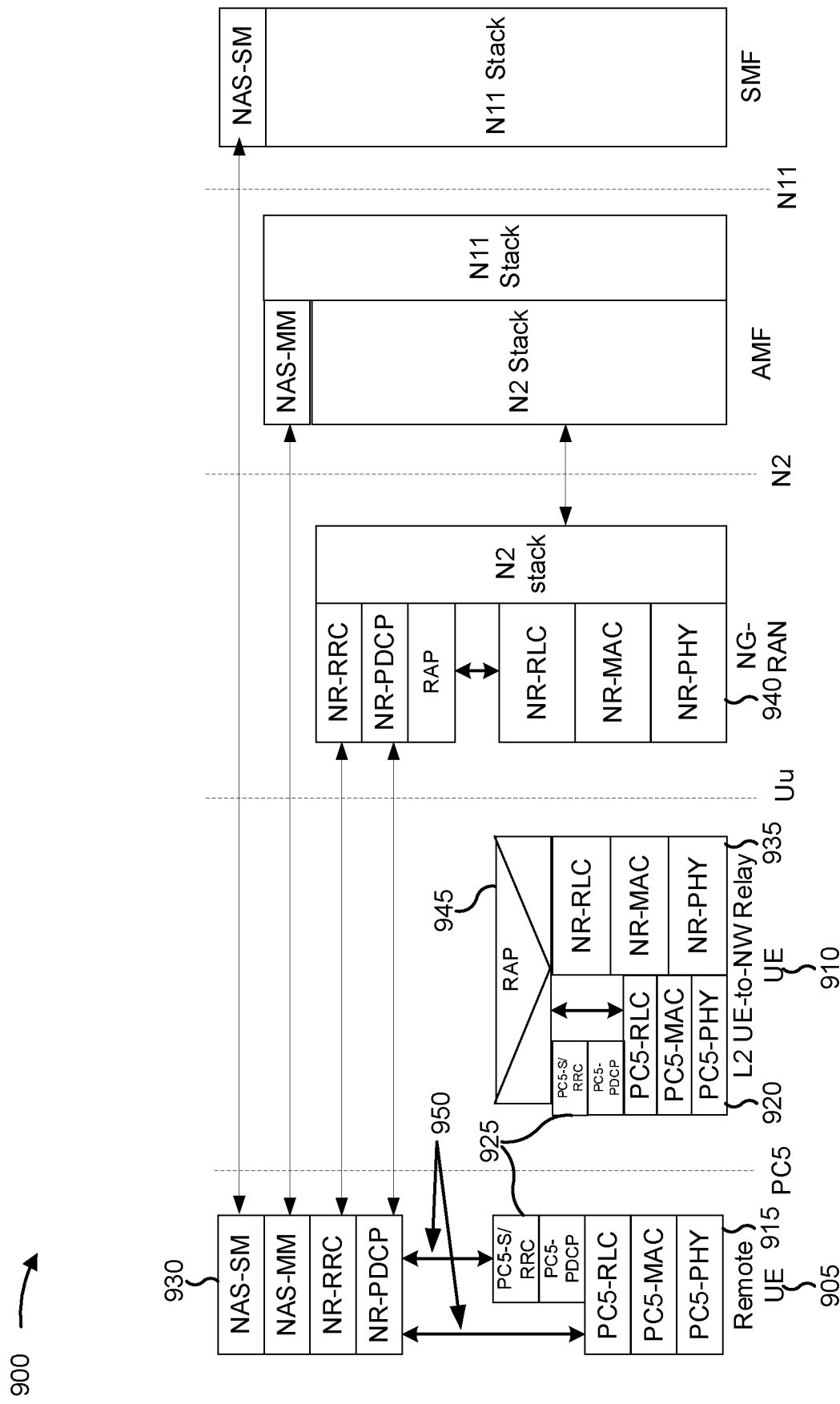
FIG. 9 is a diagram illustrating an example of a control-plane protocol architecture for a Layer 2 UE-to-network relay, in accordance with the present disclosure.
Figure 10:
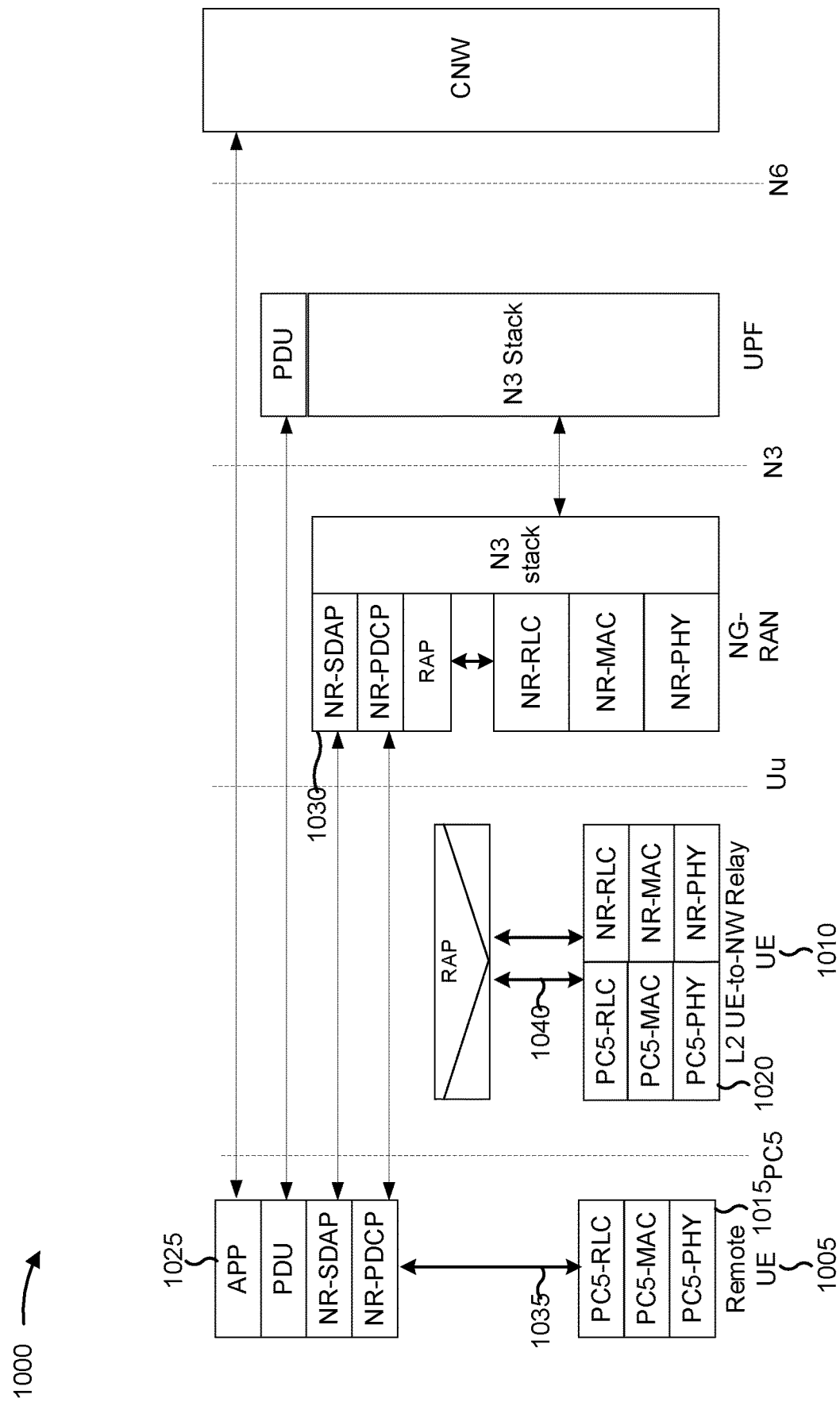
FIG. 10 is a diagram illustrating an example of a user-plane protocol architecture for a Layer 2 UE-to-network relay, in accordance with the present disclosure.

FIG. 9 is a diagram illustrating an example of a control-plane protocol architecture 900 for a Layer 2 UE-to-network relay, in accordance with the present disclosure. FIG. 10 is a diagram illustrating an example of a user-plane protocol architecture 1000 for a Layer 2 UE-to-network relay, in accordance with the present disclosure. For example, the control-plane protocol architecture 900 and the user-plane protocol architecture 1000 may correspond to a remote UE 905/1005 (e.g., UE 120) shown by reference numbers 905 and 1005 and a relay UE 910/1010 (e.g., UE 120) shown by reference numbers 910 and 1010.

As shown in FIG. 9, in the control-plane, there may be a PC5 interface (e.g., a sidelink interface) between the remote UE and the relay UE, a Uu interface (e.g., a radio access interface) between the relay UE and a next generation radio access network (NG-RAN), also referred to herein as a 5G access network (5G-AN)), an N2 interface between the NG-RAN and an access and mobility management function (AMF) of the control-plane protocol architecture 900, and an N11 interface between the AMF and a session management function (SMF).

As shown in FIG. 10, there may be an N3 interface between the NG-RAN and a user-plane function (UPF) of the user-plane protocol architecture 1000, and an N6 interface between the UPF and a core network (CNW).

As further shown, the remote UE and the relay UE may be associated with respective PC5 protocol stacks 915/920 and 1015/1020 (depicted in FIGS. 9 and 10), enabling communication on the PC5 interface between the remote UE and the relay UE. The PC5 protocol stack may include a PC5 RLC component, a PC5 MAC component, a PC5 PHY component, and/or the like. Communications between the remote UE and the relay UE using the PC5 interface may be referred to as sidelink communications. The respective PC5 protocol stacks may be associated with one or more of PC5-S entities, PC5-RRC entities, or PC5-PDCP entities, as shown by reference number 925. The PC5-S entity may manage a sidelink signaling interface, such as a PC5-S interface. A UE that includes a PC5-S entity and/or a PC5-RRC entity may handle control signaling and configuration of a sidelink connection with another UE, such as the connection used for relaying between the remote UE and the relay UE. In some aspects, the PC5 protocol stacks 915/920 and 1015/1020 may not include PC5-S entities or PC5-RRC entities. Also, in some cases, the NG-RAN may handle control signaling and configuration of the sidelink connection.

As shown by reference number 930 of FIG. 9, the remote UE is associated with a NAS stack, which includes an NAS session management (NAS-SM) component, an NAS session management (NAS-SM) component, and one or more radio access components (e.g., an NR-RRC component and an NR-PDCP component). As shown by reference number 935 of FIG. 9, the relay UE is associated with a radio access stack, including an NR-RLC component, an NR-MAC component, and an NR-PHY component. Furthermore, the NG-RAN is associated with a radio access interface stack shown by reference number 940, which includes an NR-RLC component, an NR-MAC component, an NR-PHY component, an NR-RRC entity, and an NR-PDCP entity.

The adaptation layer entity of the relay UE, shown by reference number 945, may handle relaying from the remote UE to the network or from the network to the remote UE. As used herein, "the network" may refer to any one or more of the NG-RAN, the AMF, the SMF, the UPF, or the core network (CNW). The CNW may be referred to as a 5G core (5GC). In some aspects, the adaptation layer is referred to as an adaptation layer entity. In some aspects, the adaptation layer entity may be a separate entity between an RLC entity and a packet data convergence entity. In some aspects, the adaptation layer entity may be logically part of the packet data convergence entity or the radio link control entity. The adaptation layer may be placed over the RLC layer for both CP and UP at the Uu interface between the relay UE and the gNB.

For the uplink, the Uu adaptation layer at the relay UE may support UL bearer mapping between ingress PC5 RLC channels for relaying and egress Uu RLC channels over the relay UE's Uu path. The different end-to-end radio bearers (SRB, DRB) of the same remote UE and/or different remote UEs can be subject to N:1 mapping and data multiplexing over one Uu RLC channel. For the downlink, the Uu adaptation layer can be used to support DL bearer mapping at the gNB to map end-to-end radio bearers (SRB, DRB) of the remote UE into Uu RLC channels over the relay UE's Uu path. The Uu adaptation layer can be used to support DL N:1 bearer mapping and data multiplexing between multiple end-to-end radio bearers (SRBs, DRBs) of a remote UE and/or different remote UEs and one Uu RLC channel over the relay UE's Uu path. The identity information of the remote UE's Uu radio bearer and the remote UE may be included in the Uu adaptation layer in UL/DL. The Uu adaptation layer may be used to support remote UE identification for the UL/DL traffic.

Communication between stacks of the remote UE is indicated by the lines shown by reference number 950. The line between the NR-PDCP entity and the PC5-RLC entity indicates how a message (e.g., an NR RRC message generated by the radio access protocol stack) that is not encapsulated in a sidelink signaling container, such as a PC5-S container, might be communicated from the radio access stack to the PC5 stack for transmission via the sidelink interface, or how a message that is not encapsulated in a PC5-S container might be communicated from the PC5 stack to the radio access stack after being received via the sidelink interface. Note that the line between the NR-PDCP entity and the PC5-RLC entity does not involve the PC5-S or PC5-PDCP entities, meaning that the PC5-S and PC5-PDCP entities do not handle such messages. A similar line is shown to indicate communication between the adaptation layer and the PC5-RLC entity that bypasses the PC5-S and PC5-PDCP entities of the relay UE.

The line between the NR-PDCP entity and the PC5-S or PC5-RRC entity indicates how a message (e.g., an NR RRC message generated by the radio access protocol stack) that is encapsulated in a PC5-S container might be communicated from the radio access stack to the PC5 stack for transmission via the sidelink interface, or how a message that is encapsulated in a PC5-S container might be communicated from the PC5 stack to the radio access stack after being received via the sidelink interface. Note that the line between the NR-PDCP entity and the PC5-RLC entity involves the PC5-S entity, meaning that the PC5-S entity may handle such messages.

As shown by reference number 1025 of FIG. 10, the remote UE is associated with a user-plane protocol stack, which may include an application (APP) component, a PDU component, an NR-SDAP component (e.g., a Uu-SDAP component), and an NR-PDCP component (e.g., a Uu-PDCP component). Furthermore, the NG-RAN is associated with user-plane components shown by reference number 1030, which include an NR-SDAP component and an NR-PDCP component. The NR-SDAP component and the NR-PDCP component may be referred to herein as radio access entities. The Uu SDAP/PDCP and RRC may be terminated between the remote UE and the gNB, while RLC, MAC and PHY are terminated in each link.

NR user-plane traffic (shown by a line indicated by "NR UP") may be transported between the NR-PDCP entity and the PC5-RLC component, as shown by reference number 1035. Such NR user-plane traffic may be transported to the relay UE via one or more bearers, such as a data radio bearer (DRB) or signaling radio bearer (SRB). DRBs and SRBs can also be referred to as radio bearers or radio access bearers. As shown by reference number 1040, the NR user-plane traffic may be provided from the PC5 stack of the relay UE to the adaptation component, and from the adaptation component to the radio access stack of the relay UE. The radio access stack of the relay UE may provide the NR user-plane traffic to the NG-RAN (not shown).

The physical layer may offer, to the MAC sublayer, transport channels. The MAC sublayer may offer, to the RLC sublayer, logical channels. The RLC sublayer may offer, to the PDCP sublayer, RLC channels. The PDCP sublayer may offer, to the SDAP sublayer, radio bearers. The SDAP sublayer may offer, to the CNW, QoS flows. The RAP layer may handle the mapping of these types of flows, channels, and bearers to each other to facilitate Layer 2 relay services, as described elsewhere herein. In some aspects, the RAP layer may be referred to as an adaptation layer, a relay adaption layer, and/or the like. A radio access bearer may include an SRB, a DRB, and/or the like. An RLC channel can also be referred to as an RLC bearer. In such a case, an RLC channel identifier associated with the RLC channel may be referred to as an RLC bearer identifier.

As indicated above, FIGS. 9 and 10 are provided as examples. Other examples may differ from what is described with respect to FIGS. 9 and 10.

Figure 11:
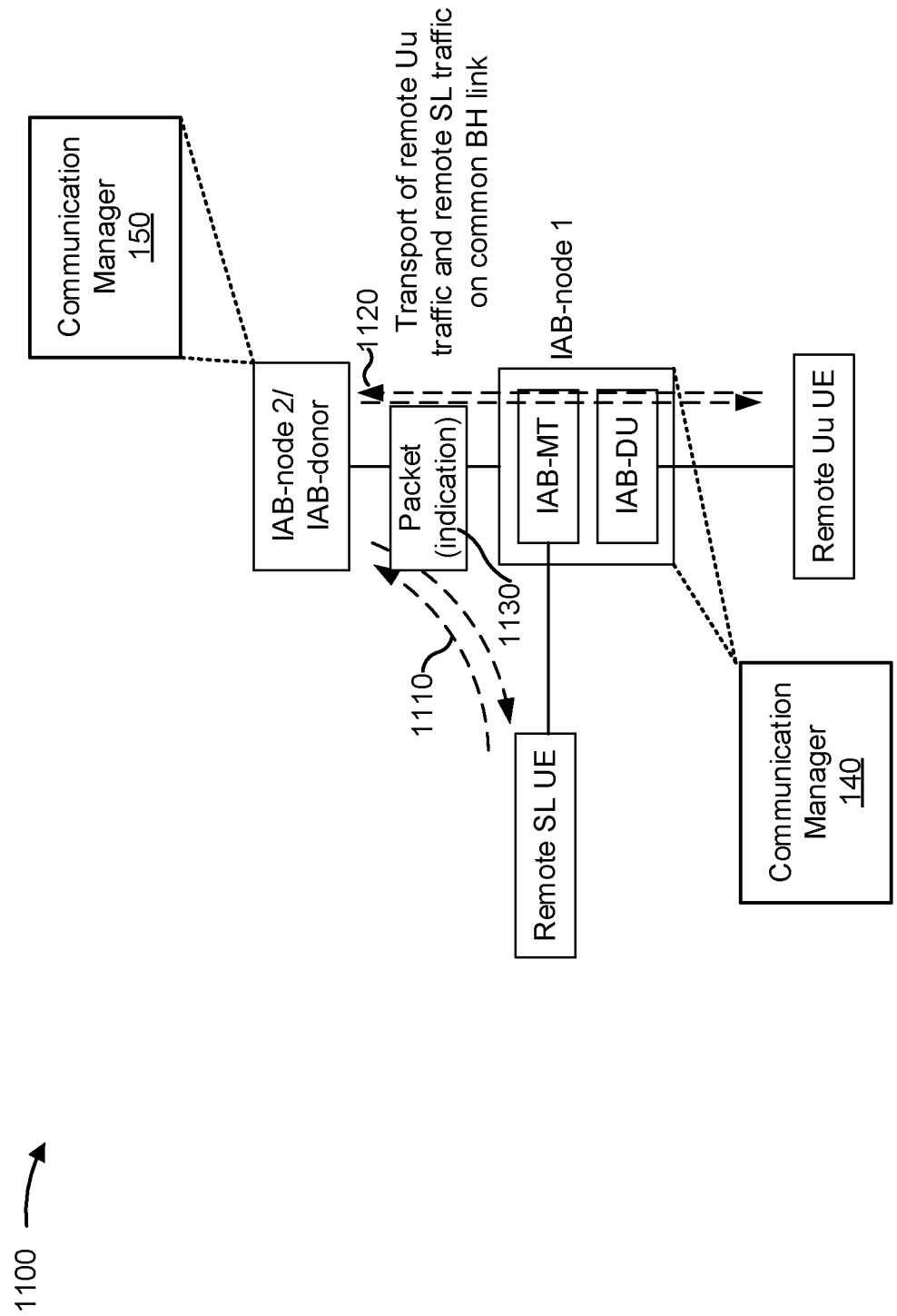
FIG. 11 is a diagram illustrating an example of transporting traffic via a wireless backhaul, in accordance with the present disclosure.

FIG. 11 is a diagram illustrating an example 1100 of transporting traffic via a wireless backhaul in accordance with an indication of whether the traffic is associated with a radio access link or a sidelink, in accordance with the present disclosure. Example 1100 includes a first IAB, shown as IAB-node 1 (e.g., non-anchor base station 345, IAB node 410, a relay UE, UE 120), a second IAB node, shown as IAB-node 2/IAB-donor (e.g., anchor base station 335, non-anchor base station 345, IAB donor 405, IAB node 410, a relay UE, UE 120), a remote sidelink UE (e.g., UE 120), and a remote Uu (e.g., radio access) UE (e.g., UE 120).

The first IAB node may act as a relay for the second IAB node. For example, an IAB-MT of the first IAB node may act as a UE-to-network relay for the remote sidelink UE, and may thus relay traffic between the remote sidelink UE and the second IAB node. Additionally, the first IAB node may act as a serving DU (e.g., an access IAB-node) for the remote Uu UE. For example, an IAB-DU of the first IAB node may relay traffic (using an IAB-MT of the first IAB node) between the remote Uu UE and the second IAB node.

The traffic for the remote sidelink UE and the remote Uu UE may be transported on the same backhaul link between the first IAB node and the second IAB node, as shown by reference numbers 1110 and 1120. Furthermore, in some aspects, a BAP layer of the first IAB node may be used as an adaptation layer for sidelink relaying.

If traffic associated with the remote sidelink UE and the remote Uu UE cannot be differentiated on the common backhaul link, then resource utilization, network efficiency, and throughput may be negatively impacted. For example, a wireless backhaul network may have to configure the remote Uu traffic and the remote sidelink traffic to be provided via different backhaul links and/or at different times via the same backhaul link, thereby diminishing throughput, network efficiency, and resource utilization.

Some techniques and apparatuses described herein enable differentiation, by a wireless node, of whether a packet is associated with a remote sidelink or a remote radio access link. For example, the packet may be associated with an indication (shown by reference number 1130) of whether the packet is associated with a radio access link (such as the Uu link with the remote Uu UE) or a sidelink (such as the sidelink with the remote sidelink UE). In some aspects, the indication may be an explicit indication. In some other aspects, the indication may be based at least in part on a split at the RLC layer, the adaptation layer, the BAP layer, or the IP layer, as described in more detail elsewhere herein. Thus, the first IAB node can multiplex and demultiplex sidelink-associated traffic and Uu-associated traffic on the same backhaul link, which improves throughput, network efficiency, and resource utilization.

As indicated above, FIG. 11 is provided as an example. Other examples may differ from what is described with regard to FIG. 11.

Figure 12:
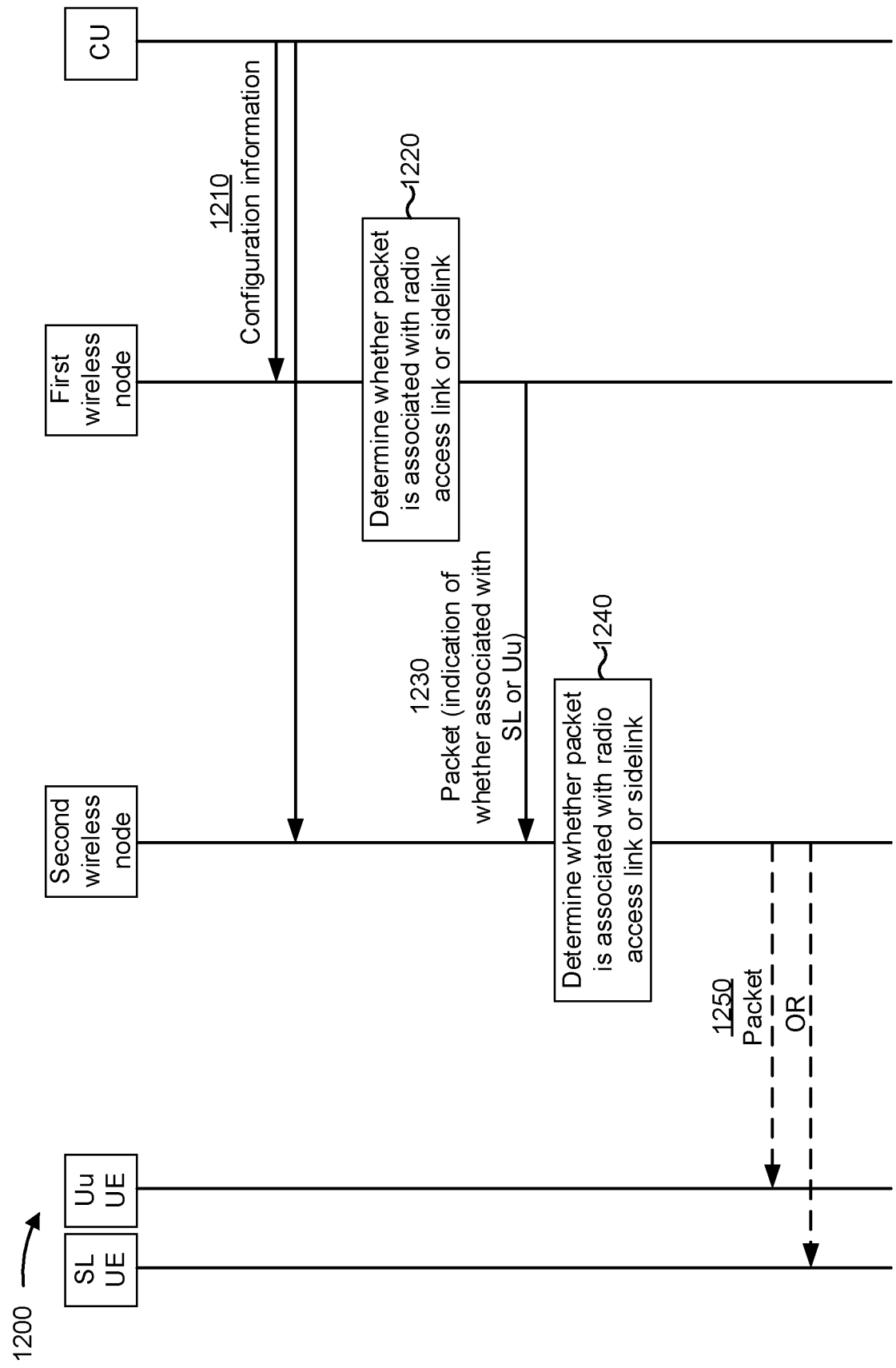
FIG. 12 is a diagram illustrating an example of signaling associated with multiplexing radio access-associated traffic and sidelink-associated traffic based at least in part on an indication, in accordance with the present disclosure.

FIG. 12 is a diagram illustrating an example 1200 of signaling associated with multiplexing radio access-associated traffic and sidelink-associated traffic based at least in part on an indication, in accordance with the present disclosure. As shown, example 1200 includes a CU (e.g., BS 110, anchor base station 335, the CU of IAB-donor 405, the IAB-donor-CU of FIGS. 5 and 6, a CU of the IAB-donor of FIG. 7, a CU of the IAB-donor of FIG. 11), a first wireless node (e.g., UE 120, BS 110, anchor base station 335, non-anchor base station 345, IAB-donor 405, IAB-node 410, IAB-node 1 of FIGS. 5 and 6, the IAB-donor or one or more of the IAB-nodes of FIG. 7, the NG-RAN or relay UE 910 of FIG. 9, the NG-RAN or relay UE 1010 of FIG. 10, IAB-node 2/IAB-donor of FIG. 11, or the like), a second wireless node (e.g., UE 120, BS 110, non-anchor base station 345, IAB-node 410, IAB-node 2 of FIGS. 5 and 6, the IAB-donor or one or more of the IAB-nodes of FIG. 7, the NG-RAN or relay UE 910 of FIG. 9, the NG-RAN or relay UE 1010 of FIG. 10, IAB-node 1 of FIG. 11, or the like), a sidelink UE (e.g., UE 120, the UE of FIGS. 5 and 6, the remote UE 905 of FIG. 9, the remote UE 905 of FIG. 10, the remote sidelink (SL) UE of FIG. 11), and a radio access UE (e.g., UE 120, the UE of FIGS. 5 and 6, the remote Uu UE of FIG. 11).

As shown by reference number 1210, the CU may provide configuration information to the first wireless node and the second wireless node. In some aspects, the configuration information provided to the first wireless node may at least partially differ from the configuration information provided to the second wireless node. In some aspects, the CU may provide the configuration information via RRC signaling, F1 signaling, or the like.

In some aspects, the configuration information may include routing information. For example, the routing information may indicate a next hop for a packet carrying a particular BAP routing identifier. As another example, the routing information may indicate a mapping between RLC channels (e.g., between BH RLC channels and access RLC channels, or between two or more BH RLC channels).

In some aspects, the configuration information may relate to an indication of whether a packet is associated with a radio access link or a sidelink. For example, the configuration information may indicate a mapping between a parameter associated with a packet and a sidelink or a radio access link. If the parameter has a first value or satisfies a first condition, the first wireless node may determine that the packet is associated with the sidelink. If the parameter has a second value or satisfies a second condition, the first wireless node may determine that the packet is associated with the radio access link.

In some aspects, the parameter may be a BAP routing identifier, a path identifier, or a destination address (e.g., a BAP address) of the packet. In some aspects, the parameter may be a bearer identifier or a tunnel identifier (e.g., a tunnel endpoint identifier associated with a GTP-U or GTP control plane (GTP-C) protocol entity) carried in the packet (or a header of the packet). In some aspects, the parameter may be a logical channel identifier (or an extended logical channel identifier). In some aspects, the parameter may be a BH RLC channel identifier. In some aspects, the parameter may be associated with or indicated by an IP header field (e.g., source IP address, destination IP address, differentiated services code point (DSCP), IPv6 flow label, etc.).

In some aspects, the parameter may relate to a resource on which the packet is communicated. For example, the configuration information may indicate a set of resources. If the packet is communicated on the set of resources, the first wireless node may determine that the packet is associated with the radio access link. If the packet is communicated on a resource not included in the set of resources, the first wireless node may determine that the packet is associated with the sidelink. In some aspects, the configuration information may configure multiple sets of resources, each associated with one of the sidelink or the radio access link.

In some aspects, the configuration information may indicate whether an indication is associated with the radio access link or the sidelink, as described elsewhere herein. In some aspects, the configuration information may indicate whether a particular traffic type or a particular traffic transport channel between the first wireless node and the second wireless node is associated with the radio access link or the sidelink.

Figure 16:
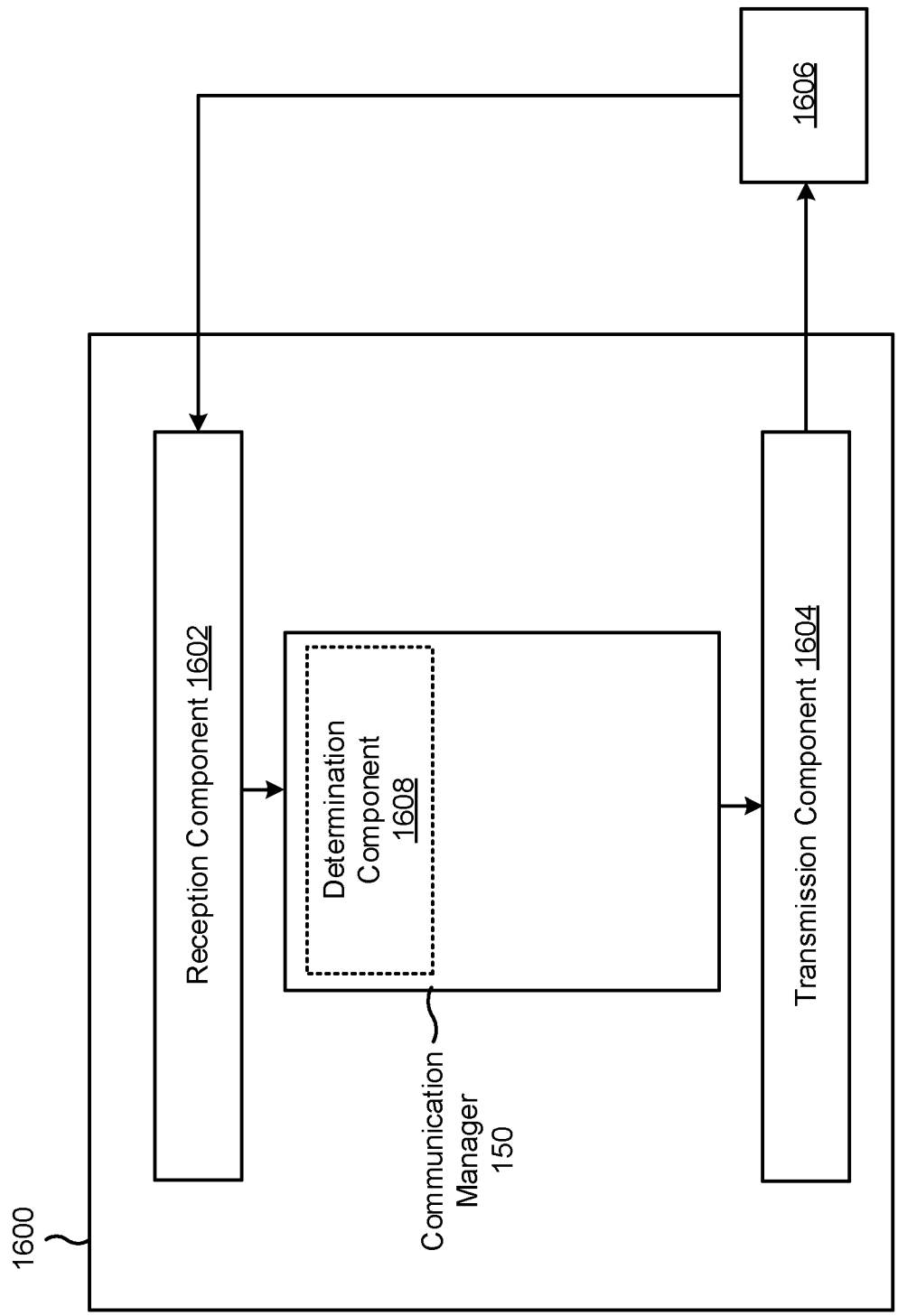
FIG. 16 is a block diagram of an example apparatus for wireless communication, in accordance with the present disclosure.

As shown by reference number 1220, the first wireless node may determine (e.g., using communication manager 150 and/or determination component 1608, depicted in FIG. 16) whether a packet is associated with a radio access link or a sidelink. In some aspects, the first wireless node may receive the packet from an upstream node. Additionally, or alternatively, the first wireless node may generate the packet. A packet associated with a radio access link is destined to a UE associated with a radio access link to the second wireless node (or a wireless node downstream from the second wireless node). A packet associated with a sidelink is destined to a UE associated with a sidelink with the second wireless node (or a wireless node downstream from the second wireless node).

The first wireless node may determine whether the packet is associated with the radio access link or the sidelink based at least in part on an indication. In some aspects, the indication is an explicit indication. For example, the packet may include a flag that explicitly indicates whether the packet is associated with the radio access link or the sidelink. In some aspects, the flag may be carried in a BAP header of the packet. In some other aspects, the indication may be associated with a parameter or value of the packet. For example, the indication may be indicated by at least part of a BAP routing identifier (e.g., the BAP routing identifier, a path identifier of the BAP routing identifier, and/or a destination address of the BAP routing identifier). As another example, the indication may be indicated by a bearer identifier or a tunnel identifier carried in the packet. As yet another example, the indication may be indicated by a logical channel identifier (such as an extended logical channel identifier) of the logical channel that transports the packet between the first IAB node and the second node.

In some aspects, the flag indicates a next protocol type above a protocol layer associated with the sidelink or the radio access link. For example, the flag may indicate whether a protocol layer above the protocol layer associated with the sidelink is an IP layer or a PDCP layer. The IP layer may correspond to the radio access link since the radio access link is associated with an F1-U or F1-C tunnel, which run on the IP protocol, as illustrated, for example, in FIGS. 5 and 6. The PDCP layer may correspond to the sidelink since sidelink bearers run on the PDCP protocol, as illustrated, for example, in FIGS. 9 and 10. The indication of the protocol type above the protocol layer associated with the sidelink or the radio access link enables the second wireless node to determine whether the packet is associated with the sidelink (if the next protocol layer is a PDCP layer) or the radio access link (if the next protocol layer is an IP layer).

As another example, the indication may be indicated by a BH RLC channel identifier of a BH RLC channel that is to transport the packet between the first IAB node and second node. As yet another example, the indication may be indicated by at least part of an IP header field of the packet, such as a source IP address, a destination IP address, a DSCP, an IPv6 flow label, or the like. As still another example, the indication may be indicated by a resource used to communicate the packet between the first wireless node and the second wireless node. As yet another example, the indication may be indicated by a configuration of the CU, a traffic type of the packet, or a traffic transport channel of the packet. For example, if the traffic type or the traffic transport channel is associated with the sidelink, then the indication may indicate that the packet is associated with the sidelink, and if the traffic type or the traffic transport channel is associated with the radio access link, then the indication may indicate that the packet is associated with the radio access link.

As shown by reference number 1230, the first wireless node may transmit (e.g., using communication manager 150 and/or transmission component 1604, depicted in FIG. 16) the packet to the second wireless node. In some aspects, the first wireless node may transmit the packet to the second wireless node via a resource, a BH RLC channel, or a logical channel associated with the indication described above. For example, if the packet is associated with a radio access link of the second wireless node, the first wireless node may transmit the packet via a resource associated with packets to be transmitted via radio access links. As another example, if the packet is associated with a backhaul link of the second wireless node, the first wireless node may transmit the packet via a resource associated with packets to be transmitted via sidelinks. In some aspects, the first wireless node may include the indication in the packet, or may transmit the indication with the packet.

Figure 15:
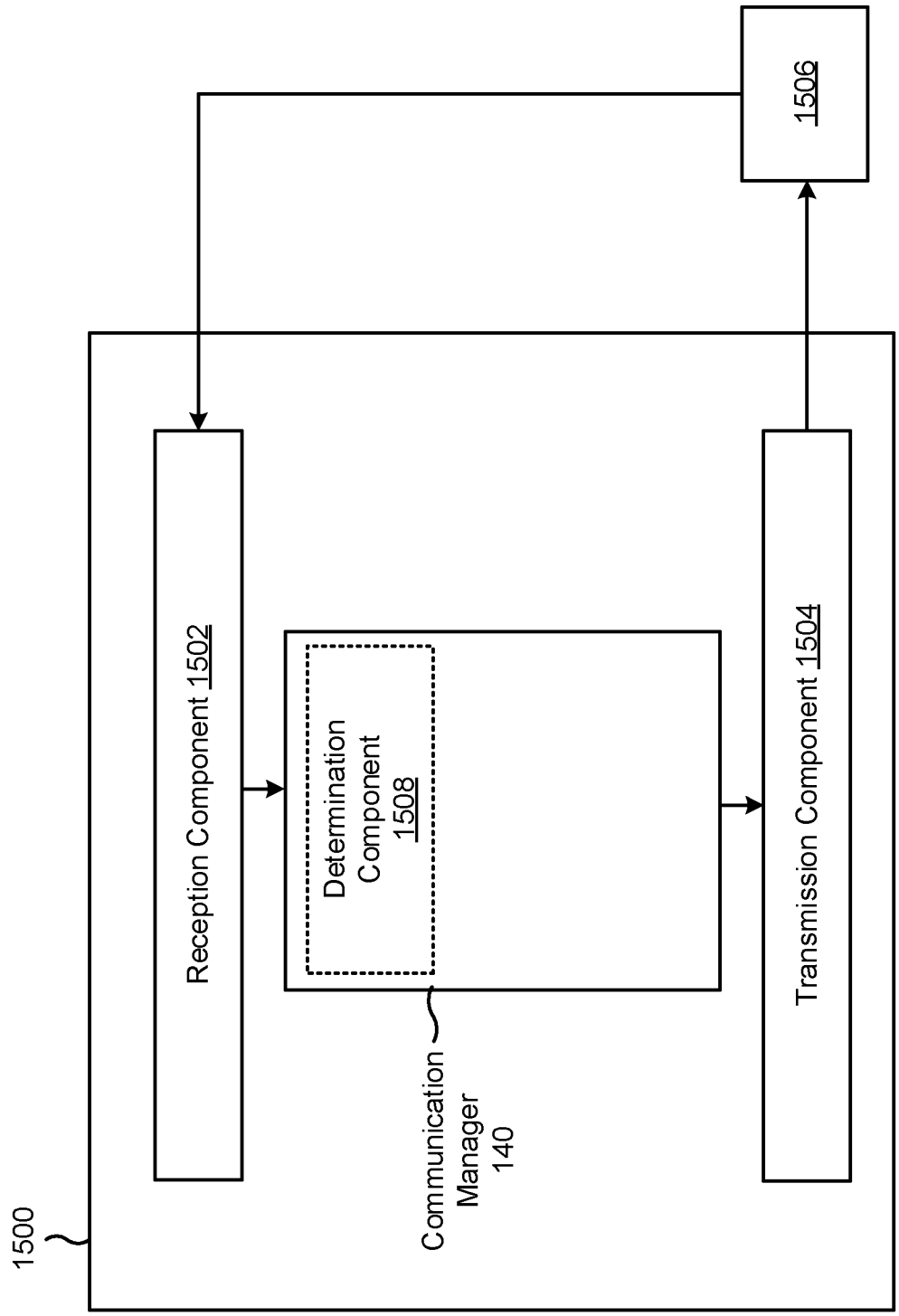
FIG. 15 is a block diagram of an example apparatus for wireless communication, in accordance with the present disclosure.

As shown by reference number 1240, the second wireless node may receive (e.g., using communication manager 140 and/or reception component 1502, depicted in FIG. 15) the packet from the first wireless node. As shown by reference number 1250, the second wireless node may determine (e.g., using communication manager 140 and/or determination component 1508, depicted in FIG. 15), based at least in part on the indication, whether the packet is associated with the sidelink or the radio access link. The determination of whether the packet is associated with the sidelink or the radio access link is described above with regard to the first wireless node's determination of whether the packet is associated with the sidelink or the radio access link. In some aspects, a wireless node (such as the first wireless node) may not determine whether the packet is associated with the sidelink or the radio access link. For example, the wireless node may be an intermediate node that forwards packets in accordance with a routing configuration. In this case, a next wireless node (to which a packet is forwarded) may determine whether the packet is associated with the sidelink or the radio access link to multiplex/demultiplex radio access traffic and sidelink traffic.

As shown by reference number 1250, the second wireless node may transmit the packet (e.g., using communication manager 140 and/or transmission component 1504, depicted in FIG. 15). If the indication indicates that the packet is associated with the radio access link, then the second wireless node may transmit the packet to the radio access UE via the radio access link. If the indication indicates that the packet is associated with the sidelink, then the second wireless node may transmit the packet to the sidelink UE via the sidelink. Thus, the first and second wireless nodes can multiplex and demultiplex sidelink-associated traffic and radio-access-associated traffic on the same backhaul link, which improves throughput, network efficiency, and resource utilization.

As indicated above, FIG. 12 is provided as an example. Other examples may differ from what is described with regard to FIG. 12. For example, while FIG. 12 illustrates an example where packets flow from the first wireless node to a UE via the second wireless node, similar techniques can be applied in the reverse direction (where a packet is generated at the Uu UE or the SL UE and is transmitted to the first wireless node via the second wireless node).

Figure 13:
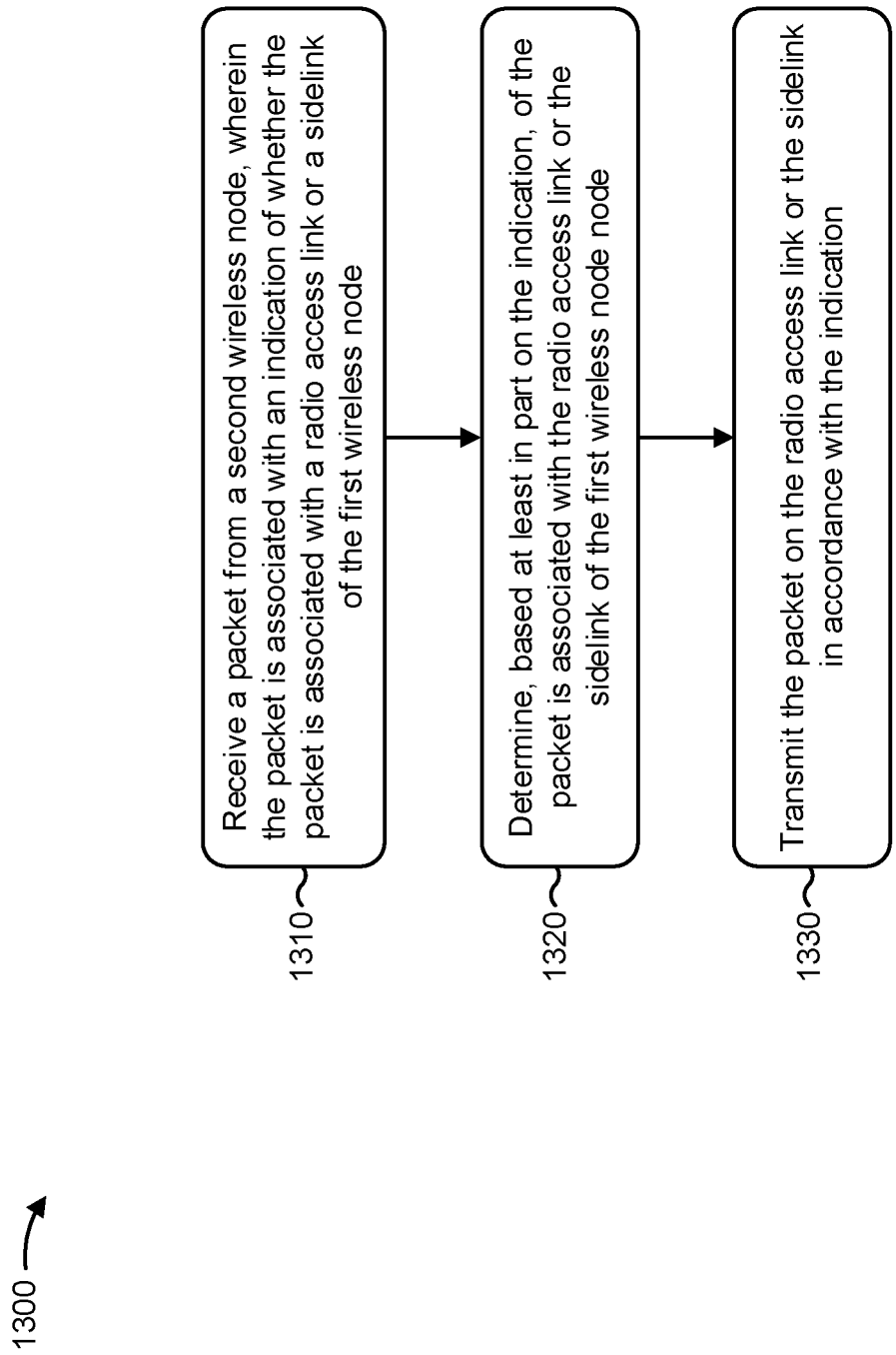
FIG. 13 is a diagram illustrating an example process performed, for example, by a first wireless node, in accordance with the present disclosure.

FIG. 13 is a diagram illustrating an example process 1300 performed, for example, by a first wireless node, in accordance with the present disclosure. Example process 1300 is an example where the first wireless node (e.g., UE 120, BS 110, non-anchor base station 345, IAB-node 410, IAB-node 2 of FIGS. 5 and 6, the IAB-donor or one or more of the IAB-nodes of FIG. 7, the NG-RAN or relay UE 910 of FIG. 9, the NG-RAN or relay UE 1010 of FIG. 10, IAB-node 1 of FIG. 11, the second wireless node of FIG. 12, or the like) performs operations associated with multiplexing sidelink and radio access traffic.

As shown in FIG. 13, in some aspects, process 1300 may include receiving a packet from a second wireless node, wherein the packet is associated with an indication of whether the packet is associated with a radio access link or a sidelink of the first wireless node (block 1310). For example, the first wireless node (e.g., using communication manager 140 and/or reception component 1502, depicted in FIG. 15) may receive a packet from a second wireless node, wherein the packet is associated with an indication of whether the packet is associated with a radio access link or a sidelink of the first wireless node, as described above, for example, in connection with reference number 1230 of FIG. 12.

As shown in FIG. 13, in some aspects, process 1300 may include determining, based at least in part on the indication, of the packet is associated with the radio access link or the sidelink of the first wireless node (block 1320). For example, the first wireless node (e.g., using communication manager 140 and/or determination component 1508, depicted in FIG. 15) may determine, based at least in part on the indication, of the packet is associated with the radio access link or the sidelink of the first wireless node node, as described above, for example, in connection with reference number 1240 of FIG. 12.

As further shown in FIG. 13, in some aspects, process 1300 may include transmitting the packet on the radio access link or the sidelink in accordance with the indication (block 1330). For example, the first wireless node (e.g., using communication manager 140 and/or transmission component 1504, depicted in FIG. 15) may transmit the packet on the radio access link or the sidelink in accordance with the indication, as described above, for example, in connection with reference number 1250 of FIG. 12.

Process 1300 may include additional aspects, such as any single aspect or any combination of aspects described below and/or in connection with one or more other processes described elsewhere herein.

In a first aspect, transmitting the packet on the radio access link further comprises transmitting the packet using a distributed unit of the first wireless node. In a second aspect, alone or in combination with the first aspect, transmitting the packet on the sidelink further comprises transmitting the packet using a mobile termination of the first wireless node. In a third aspect, alone or in combination with one or more of the first and second aspects, the indication comprises a flag indicating whether the packet is associated with the radio access link or the sidelink.

In a fourth aspect, alone or in combination with one or more of the first through third aspects, the indication is carried in a backhaul adaptation protocol (BAP) header of the packet. In a fifth aspect, alone or in combination with one or more of the first through fourth aspects, the indication comprises at least one of a routing identifier, a path identifier, or a destination address of the packet. In a sixth aspect, alone or in combination with one or more of the first through fifth aspects, the indication comprises a bearer identifier or a tunnel identifier of the packet.

In a seventh aspect, alone or in combination with one or more of the first through sixth aspects, the indication comprises a logical channel identifier of a logical channel that transports the packet between the first wireless node and the second wireless node. In an eighth aspect, alone or in combination with one or more of the first through seventh aspects, the indication comprises a backhaul radio link control channel identifier of a backhaul radio link control channel that transports the packet between the first wireless node and the second wireless node. In a ninth aspect, alone or in combination with one or more of the first through eighth aspects, the indication is included in an Internet Protocol header field of the packet. In a tenth aspect, alone or in combination with one or more of the first through ninth aspects, the indication is based at least in part on a resource on which the packet is communicated between the first wireless node and the second wireless node.

In an eleventh aspect, alone or in combination with one or more of the first through tenth aspects, process 1300 includes receiving, from a central unit, a configuration indicating whether the indication is associated with the radio access link or the sidelink. In a twelfth aspect, alone or in combination with one or more of the first through eleventh aspects, process 1300 includes receiving the indication from a central unit, wherein the indication indicates whether a traffic type or a traffic transport channel between the first wireless node and the second wireless node is associated with the radio access link or the sidelink. In a thirteenth aspect, alone or in combination with one or more of the first through twelfth aspects, the first wireless node is an integrated access and backhaul donor. In a fourteenth aspect, alone or in combination with one or more of the first through thirteenth aspects, the indication comprises a flag that indicates a next protocol type above a protocol layer of the radio access link or the sidelink.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
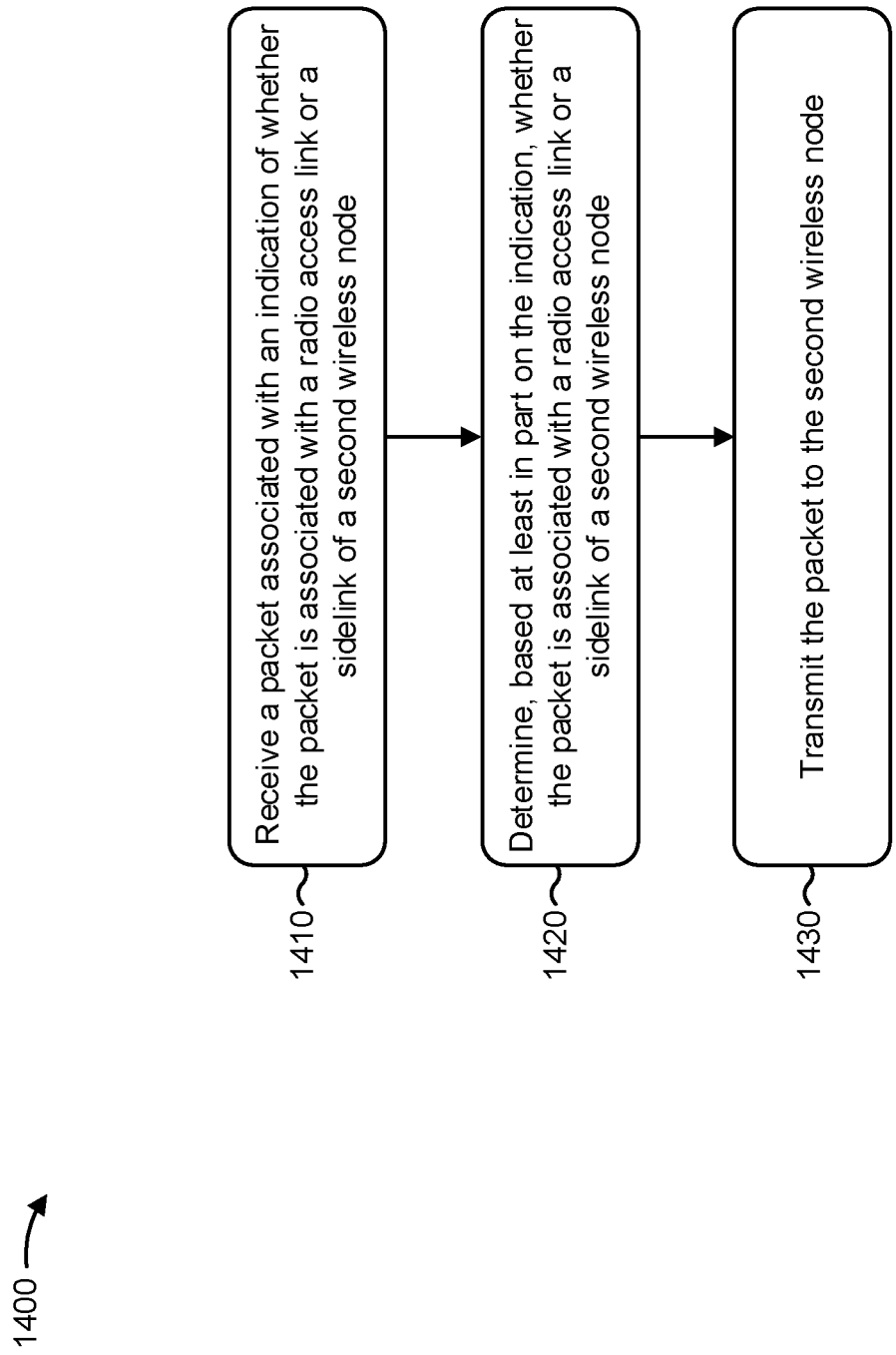
FIG. 14 is a diagram illustrating an example process performed, for example, by a first wireless node, in accordance with the present disclosure.

FIG. 14 is a diagram illustrating an example process 1400 performed, for example, by a first wireless node, in accordance with the present disclosure. Example process 1400 is an example where the first wireless node (e.g., UE 120, BS 110, anchor base station 335, non-anchor base station 345, IAB-donor 405, IAB-node 410, IAB-node 2/IAB-donor of FIGS. 5 and 6, the IAB-donor or one or more of the IAB-nodes of FIG. 7, the NG-RAN or relay UE 910 of FIG. 9, the NG-RAN or relay UE 1010 of FIG. 10, IAB-node 2/IAB-donor of FIG. 11, the first wireless node of FIG. 12, or the like) performs operations associated with multiplexing sidelink and radio access traffic.

As shown in FIG. 14, in some aspects, process 1400 may include receiving a packet associated with an indication of whether the packet is associated with a radio access link or a sidelink of a second wireless node (block 1410). For example, the first wireless node (e.g., using communication manager 150 and/or reception component 1602, depicted in FIG. 16) may receive a packet associated with an indication of whether the packet is associated with a radio access link or a sidelink of a second wireless node, as described above, for example, in connection with the determination of reference number 1220.

As shown in FIG. 14, in some aspects, process 1400 may include determining, based at least in part on the indication, whether the packet is associated with a radio access link or a sidelink of a second wireless node (block 1420). For example, the first wireless node (e.g., using communication manager 150 and/or determination component 1608, depicted in FIG. 16) may determine, based at least in part on the indication, whether the packet is associated with a radio access link or a sidelink of a second wireless node, as described above, for example, in connection with reference number 1220.

As further shown in FIG. 14, in some aspects, process 1400 may include transmitting the packet to the second wireless node (block 1430). For example, the first wireless node (e.g., using communication manager 150 and/or transmission component 1604, depicted in FIG. 16) may transmit the packet to the second wireless node, as described above, for example, in connection with reference number 1230 of FIG. 12.

Process 1400 may include additional aspects, such as any single aspect or any combination of aspects described below and/or in connection with one or more other processes described elsewhere herein.

In a first aspect, the indication comprises a flag indicating whether the packet is associated with the radio access link or the sidelink. In a second aspect, alone or in combination with the first aspect, the indication is carried in a BAP header of the packet.

In a third aspect, alone or in combination with one or more of the first and second aspects, the indication comprises at least one of a routing identifier, a path identifier, or a destination address of the packet. In a fourth aspect, alone or in combination with one or more of the first through third aspects, the indication comprises a bearer identifier or a tunnel identifier of the packet. In a fifth aspect, alone or in combination with one or more of the first through fourth aspects, the indication comprises a logical channel identifier of a logical channel that transports the packet between the first wireless node and the second wireless node.

In a sixth aspect, alone or in combination with one or more of the first through fifth aspects, the indication comprises a backhaul radio link control channel identifier of a backhaul radio link control channel that transports the packet between the first wireless node and the second wireless node. In a seventh aspect, alone or in combination with one or more of the first through sixth aspects, the indication is included in an Internet Protocol header field of the packet.

In an eighth aspect, alone or in combination with one or more of the first through seventh aspects, the indication is based at least in part on a resource on which the packet is communicated between the first wireless node and the second wireless node. In a ninth aspect, alone or in combination with one or more of the first through eighth aspects, process 1400 includes receiving, from a central unit, a configuration indicating whether the indication is associated with the radio access link or the sidelink.

In a tenth aspect, alone or in combination with one or more of the first through ninth aspects, process 1400 includes receiving the indication from a central unit, wherein the indication indicates whether a traffic type or a traffic transport channel between the first wireless node and the second wireless node is associated with the radio access link or the sidelink. In an eleventh aspect, alone or in combination with one or more of the first through tenth aspects, the first wireless node is an integrated access and backhaul donor. In a twelfth aspect, alone or in combination with one or more of the first through eleventh aspects, the indication comprises a flag that indicates a next protocol type above a protocol layer of the radio access link or the sidelink.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

FIG. 15 is a block diagram of an example apparatus 1500 for wireless communication, in accordance with the present disclosure. The apparatus 1500 may be a first wireless node, or a first wireless node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include a determination component 1508, among other examples.

In some aspects, the apparatus 1500 may be configured to perform one or more operations described herein in connection with FIGS. 3-12. Additionally, or alternatively, the apparatus 1500 may be configured to perform one or more processes described herein, such as process 1300 of FIG. 13, or a combination thereof. In some aspects, the apparatus 1500 and/or one or more components shown in FIG. 15 may include one or more components of the first wireless node described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the first wireless node described in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the first wireless node described in connection with FIG. 2. In some aspects, the transmission component 1504 may be co-located with the reception component 1502 in a transceiver.

The reception component 1502 may receive a packet from a wireless node, wherein the packet is associated with an indication of whether the packet is associated with a radio access link or a sidelink of the first wireless node. The transmission component 1504 may transmit the packet on the radio access link or the sidelink in accordance with the indication.

The reception component 1502 may receive, from a central unit, a configuration indicating whether the indication is associated with the radio access link or the sidelink.

The reception component 1502 may receive the indication from a central unit, wherein the indication indicates whether a traffic type or a traffic transport channel between the first wireless node and the second wireless node is associated with the radio access link or the sidelink.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

FIG. 16 is a block diagram of an example apparatus 1600 for wireless communication, in accordance with the present disclosure. The apparatus 1600 may be a first wireless node, or a first wireless node may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 150. The communication manager 150 may include a determination component 1608, among other examples.

In some aspects, the apparatus 1600 may be configured to perform one or more operations described herein in connection with FIGS. 3-12. Additionally, or alternatively, the apparatus 1600 may be configured to perform one or more processes described herein, such as process 1400 of FIG. 14, or a combination thereof. In some aspects, the apparatus 1600 and/or one or more components shown in FIG. 16 may include one or more components of the first wireless node described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the first wireless node described in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the first wireless node described in connection with FIG. 2. In some aspects, the transmission component 1604 may be co-located with the reception component 1602 in a transceiver.

The reception component 1602 may receive a packet associated with an indication of whether the packet is associated with a radio access link or a sidelink of a wireless node. The transmission component 1604 may transmit the packet to the wireless node.

The reception component 1602 may receive, from a central unit, a configuration indicating whether the indication is associated with the radio access link or the sidelink.

The reception component 1602 may receive the indication from a central unit, wherein the indication indicates whether a traffic type or a traffic transport channel between the first wireless node and the second wireless node is associated with the radio access link or the sidelink.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a first wireless node, comprising: receiving a packet from a second wireless node, wherein the packet is associated with an indication of whether the packet is associated with a radio access link or a sidelink of the first wireless node; and transmitting the packet on the radio access link or the sidelink in accordance with the indication.

Aspect 2: The method of Aspect 1, wherein transmitting the packet on the radio access link further comprises: transmitting the packet using a distributed unit of the first wireless node.

Aspect 3: The method of any of Aspects 1-2, wherein transmitting the packet on the sidelink further comprises: transmitting the packet using a mobile termination of the first wireless node.

Aspect 4: The method of any of Aspects 1-3, wherein the indication comprises a flag indicating whether the packet is associated with the radio access link or the sidelink.

Aspect 5: The method of any of Aspects 1-4, wherein the indication is carried in a backhaul adaptation protocol (BAP) header of the packet.

Aspect 6: The method of any of Aspects 1-5, wherein the indication comprises at least one of a routing identifier, a path identifier, or a destination address of the packet.

Aspect 7: The method of any of Aspects 1-6, wherein the indication comprises a bearer identifier or a tunnel identifier of the packet.

Aspect 8: The method of any of Aspects 1-7, wherein the indication comprises a logical channel identifier of a logical channel that transports the packet between the first wireless node and the second wireless node.

Aspect 9: The method of any of Aspects 1-8, wherein the indication comprises a backhaul radio link control channel identifier of a backhaul radio link control channel that transports the packet between the first wireless node and the second wireless node.

Aspect 10: The method of any of Aspects 1-9, wherein the indication is included in an Internet Protocol header field of the packet.

Aspect 11: The method of any of Aspects 1-10, wherein the indication is based at least in part on a resource on which the packet is communicated between the first wireless node and the second wireless node.

Aspect 12: The method of any of Aspects 1-11, further comprising: receiving, from a central unit, a configuration indicating whether the indication is associated with the radio access link or the sidelink.

Aspect 13: The method of any of Aspects 1-12, further comprising: receiving the indication from a central unit, wherein the indication indicates whether a traffic type or a traffic transport channel between the first wireless node and the second wireless node is associated with the radio access link or the sidelink.

Aspect 14: The method of any of Aspects 1-13, wherein the first wireless node is an integrated access and backhaul donor.

Aspect 15: The method of any of Aspects 1-14, wherein the indication comprises a flag that indicates a next protocol type above a protocol layer of the radio access link or the sidelink.

Aspect 16: A method of wireless communication performed by a first wireless node, comprising: receiving a packet associated with an indication of whether the packet is associated with a radio access link or a sidelink of a second wireless node; and transmitting the packet to the second wireless node.

Aspect 17: The method of Aspect 16, wherein the indication comprises a flag indicating whether the packet is associated with the radio access link or the sidelink.

Aspect 18: The method of any of Aspects 16-17, wherein the indication is carried in a backhaul adaptation protocol (BAP) header of the packet.

Aspect 19: The method of any of Aspects 16-18, wherein the indication comprises at least one of a routing identifier, a path identifier, or a destination address of the packet.

Aspect 20: The method of any of Aspects 16-19, wherein the indication comprises a bearer identifier or a tunnel identifier of the packet.

Aspect 21: The method of any of Aspects 16-20, wherein the indication comprises a logical channel identifier of a logical channel that transports the packet between the first wireless node and the second wireless node.

Aspect 22: The method of any of Aspects 16-21, wherein the indication comprises a backhaul radio link control channel identifier of a backhaul radio link control channel that transports the packet between the first wireless node and the second wireless node.

Aspect 23: The method of any of Aspects 16-22, wherein the indication is included in an Internet Protocol header field of the packet.

Aspect 24: The method of any of Aspects 16-23, wherein the indication is based at least in part on a resource on which the packet is communicated between the first wireless node and the second wireless node.

Aspect 25: The method of any of Aspects 16-24, further comprising: receiving, from a central unit, a configuration indicating whether the indication is associated with the radio access link or the sidelink.

Aspect 26: The method of any of Aspects 16-25, further comprising: receiving the indication from a central unit, wherein the indication indicates whether a traffic type or a traffic transport channel between the first wireless node and the second wireless node is associated with the radio access link or the sidelink.

Aspect 27: The method of any of Aspects 16-26, wherein the first wireless node is an integrated access and backhaul donor.

Aspect 28: The method of any of Aspects 16-27, wherein the indication comprises a flag that indicates a next protocol type above a protocol layer of the radio access link or the sidelink.

Aspect 29: An apparatus for wireless communication at a device, comprising a processor; memory coupled with the processor; and instructions stored in the memory and executable by the processor to cause the apparatus to perform the method of one or more of Aspects 1-15.

Aspect 30: A device for wireless communication, comprising a memory and one or more processors coupled to the memory, the one or more processors configured to perform the method of one or more of Aspects 1-15.

Aspect 31: An apparatus for wireless communication, comprising at least one means for performing the method of one or more of Aspects 1-15.

Aspect 32: A non-transitory computer-readable medium storing code for wireless communication, the code comprising instructions executable by a processor to perform the method of one or more of Aspects 1-15.

Aspect 33: A non-transitory computer-readable medium storing a set of instructions for wireless communication, the set of instructions comprising one or more instructions that, when executed by one or more processors of a device, cause the device to perform the method of one or more of Aspects 1-15.

Aspect 34: An apparatus for wireless communication at a device, comprising a processor; memory coupled with the processor; and instructions stored in the memory and executable by the processor to cause the apparatus to perform the method of one or more of Aspects 16-28.

Aspect 35: A device for wireless communication, comprising a memory and one or more processors coupled to the memory, the one or more processors configured to perform the method of one or more of Aspects 16-28.

Aspect 36: An apparatus for wireless communication, comprising at least one means for performing the method of one or more of Aspects 16-28.

Aspect 37: A non-transitory computer-readable medium storing code for wireless communication, the code comprising instructions executable by a processor to perform the method of one or more of Aspects 16-28.

Aspect 38: A non-transitory computer-readable medium storing a set of instructions for wireless communication, the set of instructions comprising one or more instructions that, when executed by one or more processors of a device, cause the device to perform the method of one or more of Aspects 16-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first wireless node, comprising:
   receiving, via a backhaul link, a first packet and a second packet from a second wireless node, wherein the first packet is associated with a first indication that the first packet is to be transmitted on a radio access link, and wherein the second packet is associated with a second indication that the second packet is to be transmitted on a sidelink of the first wireless node; and
   transmitting the first packet to a first user equipment (UE) on the radio access link in accordance with the first indication and the second packet to a second UE on the sidelink in accordance with the second indication.

2. The method of claim 1, wherein transmitting the first packet on the radio access link further comprises:
   transmitting the first packet using a distributed unit of the first wireless node.

3. The method of claim 1, wherein transmitting the second packet on the sidelink further comprises:
   transmitting the second packet using a mobile termination of the first wireless node.

4. The method of claim 1, wherein one or more of:
   the first indication comprises a first flag indicating that the first packet is associated with the radio access link, or
   the second indication comprises a second flag indication that the second packet is associated with the sidelink.

5. The method of claim 1, wherein one or more of:
   the first indication comprises a first flag that indicates a next protocol type above a protocol layer of the radio access link, or
   the second indication comprises a second flag that indicates a next protocol type above a protocol layer of the sidelink.

6. The method of claim 1, wherein one or more of:
   the first indication is carried in a backhaul adaptation protocol (BAP) header of the first packet, or
   the second indication is carried in a BAP header of the second packet.

7. The method of claim 1, wherein one or more of:
   the first indication comprises at least one of a first routing identifier, a first path identifier, or a first destination address of the first packet, or
   the second indication comprises at least one of a second routing identifier, a second path identifier, or a second destination address of the second packet.

8. The method of claim 1, wherein one or more of:
   the first indication comprises a bearer identifier or a tunnel identifier of the first packet, or
   the second indication comprises a bearer identifier or a tunnel identifier of the second packet.

9. The method of claim 1, wherein one or more of the first indication or the second indication comprises a logical channel identifier of a logical channel that transports one or more of the first packet or the second packet between the first wireless node and the second wireless node.

10. The method of claim 1, one or more of the first indication or the second indication comprises a backhaul radio link control channel identifier of a backhaul radio link control channel that transports one or more of the first packet or the second packet between the first wireless node and the second wireless node.

11. The method of claim 1, wherein one or more of:
    the first indication is included in an Internet Protocol header field of the first packet, or the second indication is included in an Internet Protocol header field of the second packet.

12. The method of claim 1, wherein one or more of:
the first indication is based at least in part on a resource on which the first packet is communicated between the first wireless node and the second wireless node, or
the second indication is based at least in part on a resource on which the second packet is communicated between the first wireless node and the second wireless node.

13. The method of claim 1, further comprising:
receiving, from a central unit, a configuration indicating whether the first indication is associated with the radio access link or the sidelink.

14. The method of claim 1, wherein the first wireless node is a first integrated access and backhaul node and the second wireless node is a second integrated access and backhaul node.

15. A method of wireless communication performed by a first integrated access and backhaul (IAB) node, comprising:
receiving a packet associated with an indication of whether the packet is associated with a radio access link or a sidelink of a second TAB node, wherein the indication comprises a first indication when the packet is associated with the radio access link and the indication comprises a second indication when the packet is associated with the sidelink of the second TAB node; and
transmitting the packet to the second TAB node.

16. The method of claim 15, wherein the indication comprises a logical channel identifier of a logical channel that transports the packet between the first IAB node and the second IAB node.

17. The method of claim 15, wherein the indication comprises a backhaul radio link control channel identifier of a backhaul radio link control channel that transports the packet between the first IAB node and the second IAB node.

18. The method of claim 15, wherein the indication is based at least in part on a resource on which the packet is communicated between the first IAB node and the second IAB node.

19. The method of claim 15, further comprising:
receiving, from a central unit, a configuration indicating one or more of:
that the first indication is associated with the radio access link, or
that the second indication is associated with the sidelink.

20. The method of claim 15, wherein the indication comprises a flag that indicates a next protocol type above a protocol layer of the radio access link when the indication comprises the first indication, or indicates a next protocol type above a protocol layer of the sidelink when the indication comprises the second indication.

21. An apparatus for wireless communication at a first wireless node, comprising:
a memory; and
one or more processors, coupled to the memory, configured to:
receive, via a backhaul communication link, a first packet and a second packet from a second wireless node, wherein the first packet is associated with a first indication that the first packet is associated with a radio access link and the second packet is associated with a second indication that the second packet is associated with a sidelink of the first wireless node; and transmit the first packet to a first user equipment (UE) on the radio access link in accordance with the first indication and the second packet to a second UE on the sidelink in accordance with the second indication.

22. The apparatus of claim 21, wherein the one or more processors, to transmit the first packet on the radio access link, are configured to:
transmit the first packet using a distributed unit of the first wireless node.

23. The apparatus of claim 21, wherein the one or more processors, to transmit the second packet on the sidelink, are configured to:
transmit the second packet using a mobile termination of the first wireless node.

24. The apparatus of claim 21, wherein one or more of:
the first indication comprises a first flag indicating that the first packet is associated with the radio access link, or
the second indication comprises a second flag indicating that the second packet is associated with the sidelink.

25. The apparatus of claim 21, wherein one or more of:
the first indication is based at least in part on a resource on which the first packet is communicated between the first wireless node and the second wireless node, or
the second indication is based at least in part on a resource on which the second packet is communicated between the first wireless node and the second wireless node.

26. The apparatus of claim 21, wherein the one or more processors are further configured to:
receive, from a central unit, a configuration indicating one or more of:
the first indication is associated with the radio access link, or
the second indication is associated with the sidelink.

27. The apparatus of claim 21, wherein the one or more processors are further configured to:
receive an indication from a central unit, wherein the indication indicates whether a traffic type or a traffic transport channel between the first wireless node and the second wireless node is associated with the radio access link or the sidelink.

28. An apparatus for wireless communication at a first integrated access and backhaul (IAB) node, comprising:
a memory; and
one or more processors, coupled to the memory, configured to:
receive a packet associated with an indication of whether the packet is associated with a radio access link or a sidelink of a second TAB node, wherein the indication comprises a first indication when the packet is associated with the radio access link and the indication comprises a second indication when the packet is associated with the sidelink of the second TAB node; and
transmit the packet to the second TAB node.

29. The apparatus of claim 28, wherein the indication comprises a logical channel identifier of a logical channel that transports the packet between the first TAB node and the second TAB node.

30. The apparatus of claim 28, wherein the indication comprises a backhaul radio link control channel identifier of a backhaul radio link control channel that transports the packet between the first TAB node and the second TAB node.

* * * * *